United States Patent [19]

Fishkin et al.

[11] Patent Number: 5,841,437

[45] Date of Patent: Nov. 24, 1998

[54] METHOD AND APPARATUS FOR INTERACTIVE DATABASE QUERIES VIA MOVABLE VIEWING OPERATION REGIONS

[75] Inventors: Kenneth P. Fishkin, Redwood City; Maureen C. Stone, Los Altos; Jock D. Mackinlay, Palo Alto, all of Calif.

[73] Assignee: Xerox Corporation, Stamford, Conn.

[21] Appl. No.: 484,759

[22] Filed: Jun. 7, 1995

Related U.S. Application Data

[63] Continuation-in-part of Ser. No. 96,193, Jul. 21, 1993, Pat. No. 5,479,603.

[51] Int. Cl.$^6$ .................................................... G06T 3/00
[52] U.S. Cl. ........................................ 345/346; 345/433
[58] Field of Search .................................... 345/346, 339, 345/343, 348, 340, 968, 974, 680, 433, 434, 435, 440, 113, 118, 119; 705/1, 3; 395/155, 161, 151, 159, 133, 134, 135, 600, 160, 140, 339, 343, 346, 348, 340, 968, 974, 601, 603, 680

[56] References Cited

U.S. PATENT DOCUMENTS

| | | | |
|---|---|---|---|
| 4,870,576 | 9/1989 | Tornetta | 705/1 |
| 5,021,976 | 6/1991 | Wexelblat et al. | 345/356 |
| 5,032,989 | 7/1991 | Tornetta | 705/1 |
| 5,133,052 | 7/1992 | Bier et al. | 707/530 |
| 5,421,008 | 5/1995 | Banning et al. | 707/4 |
| 5,467,441 | 11/1995 | Stone et al. | 345/433 |
| 5,479,603 | 12/1995 | Stone et al. | 345/326 |
| 5,515,488 | 5/1996 | Hoppe et al. | 345/440 |
| 5,581,670 | 12/1996 | Bier et al. | 345/326 |
| 5,617,114 | 4/1997 | Bier et al. | 345/113 |
| 5,652,851 | 7/1997 | Stone et al. | 345/346 |

OTHER PUBLICATIONS

Bier et al., "Toolglass and Magic Lenses: The See–Through Interface", Computer Graphics Proceedings, Annual Conference Series, pp. 73–80, Aug. 1993.

IEEE Computer Graphics and Applications, Sep. 1994, "VisDB: Database Exploration Using Multidimensional Visulization", by Keim, et al., pp. 40–49.

CHI'92, May 3–7, 1992, "Dynamic Queries for Information Exploration: An Implementation and Evaluation", by Christopher Ahlberg, et al., pp. 619–626.

IEEE 1990, "Manipulating the Graphical Representation of Query Results in Geographic Information Systems", by Max J. Egenhofer, pp. 119–124.

Human Factors in Computer Systems, Apr. 24–28, 1994, "Using Aggregation and Dynamic Queries for Exploring Large Data Sets", by Jade Goldstein, pp. 23–29.

Visual Recall User Guide, Chapter 6, "Using Advanced Search Teachniques", 1994, pp. 6–1, 6–3–6–10.

Human Factors in Computer Systems, Boston MA (Apr. 24–28, 1994), "Visual Informatiion Seeking: Tight Coupling of Dynamic Query Filters with Starfield Displays", by Christopher Ahlberg, et al., pp. 313–317.

"C. Problems Involving More Than Three Components", pp. 254–255, *Semiology of Graphics,* University of Wisconsin Press, 1983, by Jacques Bertin.

*Primary Examiner*—Matthew M. Kim
*Assistant Examiner*—Crescelle N. dela Torre
*Attorney, Agent, or Firm*—Fay, Sharpe, Beall, Fagan, Minnich & McKee

[57] ABSTRACT

An information visualization system which uses dynamic queries in combination with movable viewing operation regions (VORs) for searching of two dimensional databases. Boolean and real-valued queries are made by overlapping viewing operation regions which include filters to search for specific data in the database. The viewing operation regions include interactive interfaces such as sliders and/or buttons to control the value of the filter function and define a composition operation generated by overlapping the VORs. The system provides a graphical display of database values and direct manipulation tools for exploring relationships between the database.

18 Claims, 17 Drawing Sheets

| | CRIME RATE | ..... | PROVERTY LEVEL | ..... |
|---|---|---|---|---|
| ⋮ | ⋮ | ⋮ | ⋮ | ⋮ |
| DALLAS | n | ⋮ | n | ⋮ |
| ⋮ | ⋮ | ⋮ | ⋮ | ⋮ |
| SAN FRANSISCO | n | ⋮ | n | ⋮ |
| ⋮ | ⋮ | ⋮ | ⋮ | ⋮ |

D/92494 4/8/93

METHOD AND APPARATUS FOR INTERACTIVE DATABASE QUERIES VIA MOVABLE VIEWING OPERATION REGIONS

This is a continuation-in-part of application No. 08/096, 193, filed Jul. 21, 1993, now U.S. Pat. No. 5,479,603.

CROSS REFERENCE TO OTHER APPLICATIONS

The present invention is related to other inventions that are the subject matter of concurrently filed, commonly assigned U.S. patent applications having the following serial numbers and titles: Ser. No. 08/096,521, now issued U.S. Pat. No. 5,652,851, Jul. 29, 1997, "User Interface Technique for Producing a Second Image in the Spacial Context of a First Image Using a Model-Based Operation", which is hereby incorporated by reference herein; Ser. No. 08/096, 200, now issued U.S. Pat. No. 5,596,690, Jan. 21, 1997; "Method and Apparatus for operations on an Object-Based Model Data Structure to Produce a Second Image in the Spatial Context of a First Image"; Ser. No. 08/096,193, now U.S. Pat. No. 5,479,603, Dec. 26, 1995; "Method and Apparatus for Producing a Composite Second Image in the Spatial Context of a First Image", which is hereby incorporated by reference herein; Ser. No. 08/095,974, "User-Directed Method for Operating on an Object-Based Model Data Structure Through a Second Contextual Image"; Ser. No. 08/320,975, now U.S. Pat. No. 5,467,441, Nov. 14, 1995; "Method for Operating on Objects in a First Image Using an Object-Based Model Data Structure to Produce a Second Contextual Image having Added, Replaced, or Deleted Objects"; and Ser. Nos. 08/D940923, 08/429376. METHOD AND APPARATUS FOR OPERATING ON THE MODEL DATA STRUCTURE OF AN IMAGE TO PRODUCE HUMAN PERCEPTIBLE OUTPUT USING A VIEWING OPERATION REGION HAVING EXPLICIT MULTIPLE REGIONS.

FIELD OF THE INVENTION

The present invention relates generally to a method of generating and displaying dynamic database queries with a processor-controlled machine, and to a processor-controlled machine operated according to the method. More particularly, the present invention relates to visual formulation of dynamic database queries using movable viewing operation regions (VORs) with filters constructed to produce a composite second image for display by operating on stored data attributes and on the model data structure from which a first displayed image was produced.

BACKGROUND

Copending, concurrently filed, commonly assigned U.S. patent applications Ser. No. 08/096,521, now U.S. Pat. No. 5,652,851 and U.S. Ser. No. 08/096,200, now U.S. Pat. No. 5,596,690; provide a second view of an original image in the spatial context of the original image by providing methods for operating a processor-controlled machine that operate on a model data structure from which a first image has been produced in order to produce a second image for display in the spatial context of the first image.

A viewing operation region (VOR) or lens is displayed coextensively with a first image segment of the first image in the display area of the machine's display device. The first image segment includes a display feature representing a model data item in the model data structure. In response to the display of the VOR, the method operates on the model data item in the model data structure to produce a second image for display in the VOR showing information related to the display feature in the original image. Whereas the above discussed patent applications disclose a VOR displayed coextensively with a first image, whereby the second image is displayed in substantially the same area as the first image, Ser. No. 08/096,200 discloses a VOR having explicit viewing regions such that the displayed second image is distanced from the first image.

As shown in Ser. No. 08/096,521 now U.S. Pat. No. 5,652,851; and Ser. No. 08/096,200, now U.S. Pat. No. 5,652,851 and Ser. No. 08/924,376, multiple views of the same original image may be displayed by using more than one VOR positioned over different parts of the original image. A viewing operation associated with each VOR maps the model data structure that produced the original, or first, image, to the second image that provides the second view in the VOR.

Ser. No. 08/096,193, now U.S. Pat. No. 5,479,376 provides an improvement to the processor controlled methods disclosed in Ser. No. 08/096,521, now U.S. Pat. No. 5,652, 851; Ser. No. 08/096,200, now U.S. Pat. No. 5,596,690 and Ser. No. 08/429,376 by composing, or combining, the functions of multiple viewing operations operating on the model data structure that produced an image in order to produce a single composite image displayed in the context of the original image. The composite image produced from composing the viewing operations may be an aesthetically enhanced image; or it may provide information from the first image model data structure displayed in a new manner or organization; or it may present new information from the first image model data structure not presented in the first image.

The above cited patent applications disclose a viewing operation region VOR or lens which combines an arbitrarily-shaped region with an operator that changes the view of objects viewed through that region. As disclosed in Ser. No. 08/096,193, now U.S. Pat. No. 5,479,603, the lenses may overlap, forming a 2 1/2D stack. When the lenses overlap, their operators compose. For example, when a lens A which turns an object red, overlaps a lens B having double line widths, objects within the region are turned red and their line widths are doubled. The most detailed discussion regarding the composition of the lenses in this application described a process called model-in/model-out. In this process, the output of one lens (its "model") is the input of the next lens.

While such composition has been found to be useful in providing alternative views to graphical representations, there has been no discussion regarding the use of these VORs in connection with systems including databases containing data to which a user of a system may want to make queries.

Traditional database query systems have allowed users to construct complicated database queries from specialized database language primitives. While such systems have certain powerful attributes, the difficulty in using these systems restrict their value, especially when the user is unfamiliar with the database scheme. Information visualization systems provide graphical display of database values and direct manipulation tools for exploring relationships between the data. Such systems have advantages over language-based systems, including a visual representation that provides an intuitive feel for the scope of the data, immediate feedback, and incremental, reversible interactions.

One type of existing system known as scatterplots or thematic maps provide well established techniques for displaying data as points in a 2-D field. Examples of such techniques are discussed in *Semiology of Graphics*, University of Wisconsin Press, 1983, by Jacques Bertin, and in *The Visual Display of Quantitive Information*, Graphics Press, 1983, by Edward R. Tufte. Such displays encode large amounts of data and provide an intuitive way to visualize groups of related data items. Transformations of the display produce patterns that are easy to interpret, even for high-dimensional data sets, such as disclosed in *VisDB: Database Exploration Using Multidimensional Visualization*, IEEE CG&A, 14(5), September 1994, pp. 40–49, by Daniel A. Keim and Hans-Peter Kreigel.

As discussed in *Dynamic Queries For Information Exploration: an Implementation and Evaluation*, Proceedings of CHI'92, pp. 619–626, by Christopher Ahlberg, Christopher Williamson, and Ben Shneiderman, dynamic queries apply direct manipulation techniques for constructing database queries. Selectors are used to control the range of values required for a particular attribute or set of attributes. When combined with a graphical representation of the database such as the aforementioned scatterplot, users can explore different subsets of the data by manipulating the selectors. Such a use is set forth in *Visual Information Seeking: Tight Coupling of Dynamic Query Filters with Starfield Displays*, Proceedings of CHI'94, (Boston, Mass. April 24–28) ACM, New York (1994), pp. 313–317, by Christopher Ahlberg and Ben Shneiderman. In this arrangement, the number of attributes that can be controlled is limited by the number of selectors that can be applied to the data. The effect of combining slider type filters is strictly conjunctive; disjunctive queries may only be performed by performing each sub-query sequentially. The effects of the selectors are global; there is no manner of limiting the scope to only a portion of the data except by zooming in on the area of interest. Finally, the number of selectors and hence the number of possible queries is fixed in advance.

The material disclosed in the article *Using Aggregation and Dynamic Queries for Exploring Large Data Sets*, Proceedings of CHI'94, (Boston, Mass., April 24–28) ACM, New York, (1994), pp. 23–29, by Jade Goldstein and Steven F. Roth as well as the system described in *Visual Recall for Windows*, XSoft Corporation, Xerox Corporation, Palo Alto, California, Calif. 1994, allow somewhat more powerful (but non-interactive) queries, supporting disjunctive and limited compound compositions via textual, hierarchial, menu-driven interfaces. *Proceedings of the* 1990 *IEEE Workshop on Visual Languages*, IEEE Computer Society Press, Los Alamitos, Calif., 1990, pp. 119–124, by Max J. Egenhofer provides a hybrid technique where query operands which are typed into a system using a database language are visually composed with modes that support disjunctive, conjunctive, and subtractive compositions.

The above cross-referenced patent applications have detailed the construction and use of viewing operation regions (VORs) or lenses. These VORs which have filtering functions are a user interface tool that combine an arbitrarily-shaped region with an operator that changes the view of objects viewed through that region. The operator can be quite general, accessing the underlying data structures of the application and reformatting the data to generate a modified view. The VORs are spatially bounded, may be parameterized, and are interactively positioned over on-screen applications. VORs with filters may overlap, in which case they compose their effects in the overlapped region.

One advantage of the VORs for data visualization is that they are spatially bounded. This allows them to perform their operation within a restricted focus while maintaining a global context. Since these VORs can be overlapped, compositional semantics can be defined and controlled.

SUMMARY OF THE INVENTION

For purposes of describing the invention and all of its embodiments in as concise a manner as possible, Table 1 lists some elements of the present invention with their respective abbreviations. These abbreviations will be used in the remainder of the specification when referring to these elements.

TABLE 1

Abbreviations

| Abbreviation | Element |
|---|---|
| 1VOR | a first viewing operation region or lens |
| 1VOR-SI | a second image produced for display in the first viewing operation region |
| VO1 | a first viewing operation |
| 2VOR | a second viewing operation region or lens |
| 2VOR-SI | a second image produced for display in a second viewing operation region |
| VO2 | a second viewing operation |
| C1 + 2VOR | a composite viewing operation region or lens defined by the coextensively positioned portions of the first viewing operation region and the second viewing operation region in the display area |
| C1 + 2VOR-SI | a composite second image produced for display in the composite viewing operation region |
| 1VOR-NC | the non-composite first viewing operation region or lens, or the remaining portion of the first viewing operation region or lens that is outside the composite viewing operation region or lens |
| 1VOR-NC-SI | a second image produced for display in the non-composite portion of the first viewing operation region |
| 2VOR-NC | the non-composite second viewing operation region or lens, or the remaining portion of the second viewing operation region or lens that is outside the composite viewing operation region or lens |
| 2VOR-NC-SI | a second image produced for display in the non-composite portion of the second viewing operation region |
| nVOR mVOR | in general, for multiple viewing operation regions or lenses, n and m correspond to, respectively, the nth and mth viewing operation regions or lenses displayed |
| Cm + nVOR | in general, for multiple viewing operation regions or lenses, Cm + nVOR corresponds to the composite viewing operation defined by the coextensively positioned portions of the mth viewing operation region or lens and the nth viewing operation region or lens in the display area |

The method of the present invention is directed to operating a machine to visually display dynamic queries made to a database and to provide visual results of the queries. The method includes generating in a memory of the machine a database comprised of a plurality of objects and a plurality of sets of data attributes. Each of the objects has one of the sets of data attributes linked thereto. A display device of the machine represents a plurality of images, where each of the images represent one of the plurality of objects of the database or displays one object of the database a plurality of times. A first viewing operating region having a first viewing operation is generated. The first viewing operation is used to select a first type of data attribute of the plurality of attributes. The first viewing operation region is positioned on a portion of the plurality of images on the display device and the first viewing operation of the first viewing operation region operates on the selected first type of data attribute.

A second viewing operation region is generated having a second viewing operation for selecting a second type of data attribute and further having a composite mode. The second viewing operation region is positioned on a portion of the plurality of the images on the display device. The positioning of the second viewing operation region can be at least partially coextensive with the first viewing operation region, such that the first viewing operation region and the second viewing operation region are positioned over at least some of the same images displayed on the display device. The second viewing operation of the second viewing operation region then operates on the selected second type of data attribute, and further operates on the data attributes operated on by the first viewing operation and the data attributes operated on by the second viewing operation in accordance with the composition mode of the second viewing operation region, for those images over which the first viewing operation region and the second viewing operation region are coextensively positioned. Thereafter, at least one of the images on the display device is altered in response to results of the operation of the composition mode.

In another aspect to the present invention, the composition mode performs boolean operations including at least AND, OR and NOT.

In another aspect of the invention, the composition mode is extended to operate on real valued data. The returned real valued data has applied to it operators including at least MIN and MAX functions.

In still another aspect of the present invention, the first viewing operation region and a second viewing operation region are combined to form a first compound viewing operation region having the characteristics of the first and second viewing operation regions.

In still another aspect of the present invention, a plurality of additional viewing operation regions are generated and the viewing operation regions are grouped in a desired manner.

In still another aspect of the present invention, the viewing operation regions are transparent such that a viewer observing the display screen will be able to see through to the display output.

An advantage of the present invention is the capability to visually formulate database queries and visually present the results of the queries. The provision of conjunction/disjunction, negation and groupings of the viewing operation regions provides an advantage of allowing the visual generation of any boolean query. By extending the subject invention to real valued results, still another advantage of visually generating statistical and fuzzy queries through the use of visualization is accomplished.

DETAILED DESCRIPTION OF THE ILLUSTRATED EMBODIMENTS

A. The First Image Model Data Structure
  a. Model data structure sources.
  b. Object-based model data structures.
    1. The machine environment.
B. Description of the Method of the Present Invention
  1. The initial contents of the display area include a first viewing operation region and a second image displayed therein, showing information about the first image model data structure.
  2. Producing the composite second image for display in the composite viewing operation region.
  3. Producing non-composite images for display.
  4. Composing viewing operation regions using a second model data structure.
  5. Composition viewing operation regions used to visually formulate database queries.
    a. VOR construction
    b. Grouping of VORs
    c. Using movable VORs with filtering characteristics and boolean composition modes to create dynamic queries
    d. VORs used for real-valued queries and undefined data values A. The First Image Model Data Structure
  a. Model data structure sources.

Figure 12:
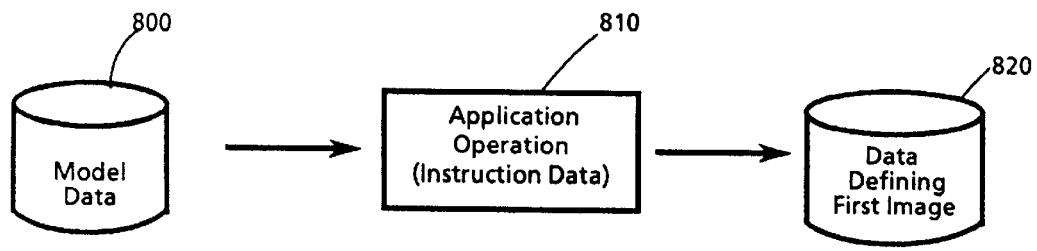
FIGS. 12, 13 and 14 illustrate examples of sources of model data in a first image model data structure from which a first image may be produced, and on which the method of the present invention operates.
Figure 13:
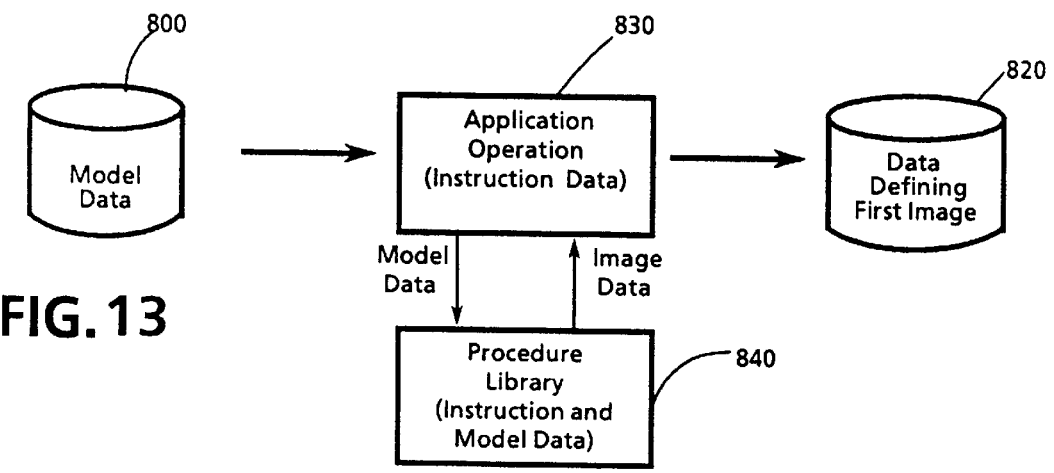
Figure 14:
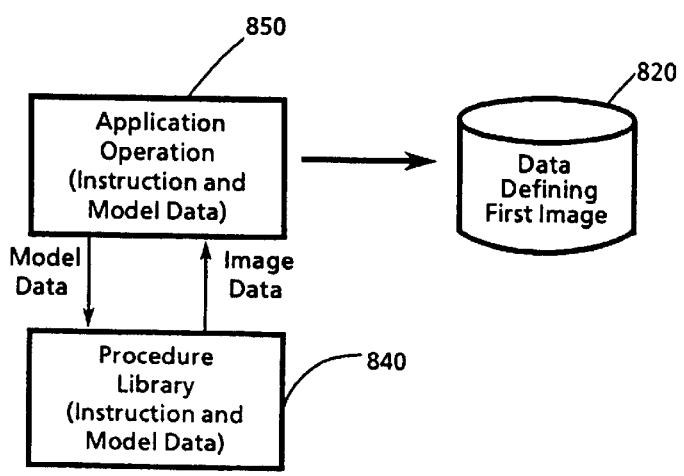

The method of the present invention "operates on" an image when it uses the model data structure from which the image was produced to produce image definition data defining a second image. The model based operation that produced the first, or original, image in the description of the invention that follows will be referred to as an "application". FIGS. 12, 13, and 14 illustrate examples of the source of the model data used by the application, its interaction with the application, and the variability of the functionality of the application which produces what is referred to below as the first image. Variations of the examples illustrated in FIGS. 12, 13, and 14 as they relate to the source of the model data and its interaction with the application are also possible, and are intended to be encompassed in the discussion of the illustrated embodiments of the present invention.

Figure 15:
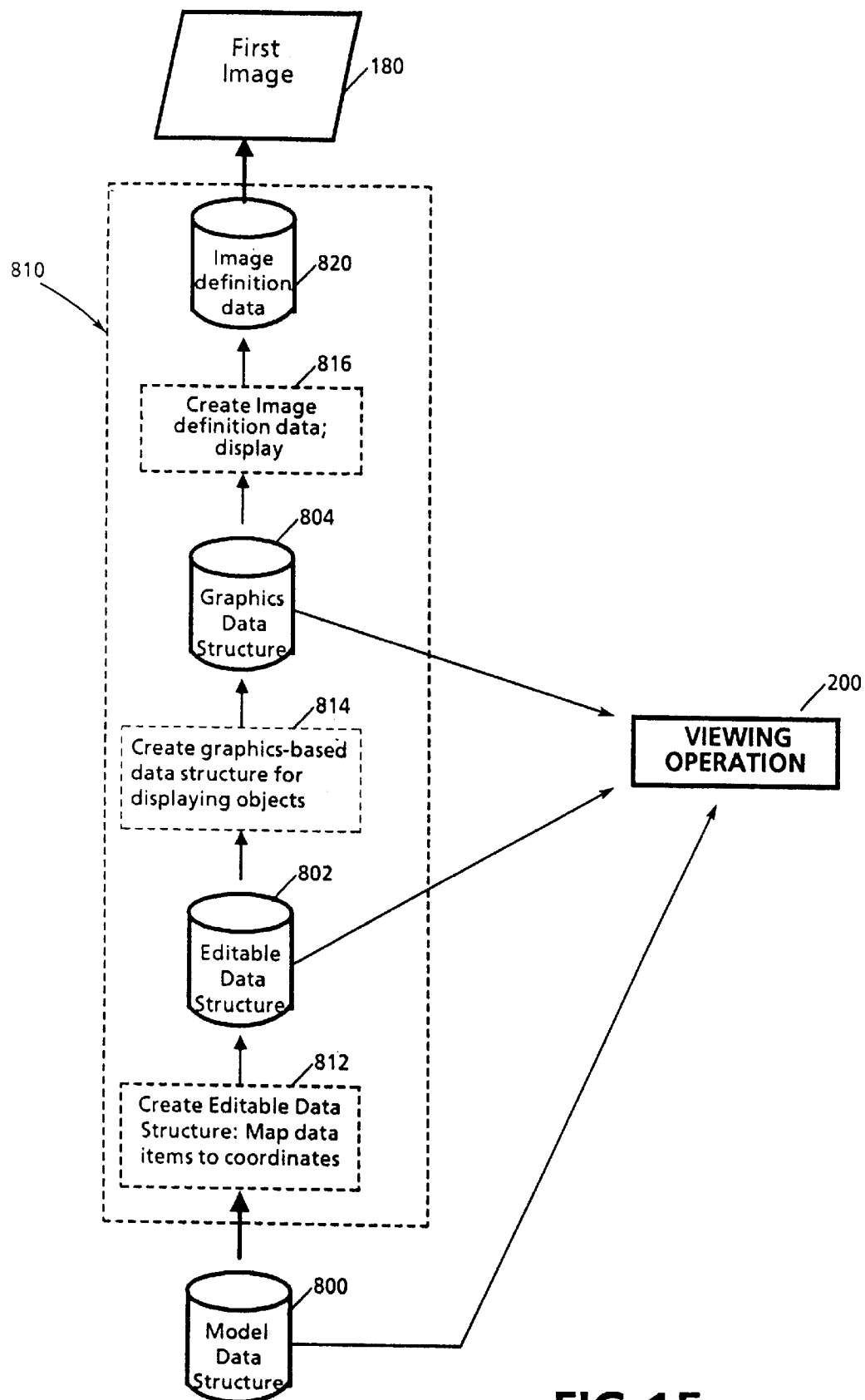
FIG. 15 illustrates types of model data structures on which the method of the present invention may operate.

In FIG. 12, model data 800 contains data items including sufficient information to permit the application 810 to entirely produce image data 820 defining the image. So, for example, if the image defined by image definition data structure 820 includes a display object perceived as a solid black line, the solid black line represents one or more data items in model data 800 indicating the existence, position, and orientation of the line in the image, and having values of the "blackness" and "solidness" of the line. Thus, according to the terminology defined herein above, all of those model data items in model data 800 used to produce the solid black line are part of the "model data structure" as that term is intended to be used herein, and the solid black line can be said to represent those model data items. A page description data file, described in more detail in the discussion below accompanying FIG. 15, is an example of model data 800 in FIG. 12.

Or, as shown in FIG. 13, application 830 may make use of components of instruction data that perform the common and basic functions used to produce an image. These components, commonly called procedures or subroutines, may be stored in a separate memory location called a procedure library 840. The procedures themselves may include model data items. So, for example, for the same image defined by image definition data structure 820 that includes the solid black line, the solid black line represents one or more data items in model data 800 indicating the existence of the line in the image, and also represents one or more data items in procedure library 840 indicating the position and orientation of the line in the image, and having values of the "blackness" and "solidness" of the line. Thus, the display object of the solid black line can be mapped to data items in model data 800 and in procedure library 840. According to the terminology defined herein above, all of those model data items in model data 800 and in procedure library 840 used to produce the solid black line are part of the "model data structure", and the solid black line can be said to represent those model data items.

Finally, as shown in FIG. 14, application 850 may make use of procedures in procedure library 840, and may also include model data items within its own set of instruction data, such as parameter values, lists, tables and arrays, that are used to produce image definition data structure 820. For the same image defined by image definition data structure 820 that includes the solid black line, the solid black line represents one or more data items in application 850 indicating, for example, the existence of the line in the image and having values of the "blackness" and "solidness" of the line, and also represents one or more data items in procedure library 840 indicating the position and orientation of the line in the image. Again, all of those model data items used to produce the solid black line are part of the model data structure, and the solid black line represents those model data items.

For ease of reference in the remainder of the specification, a reference to the first image model data structure, which the application uses to produce the first image and on which the method of the present invention operates, is intended to include all of the model data items used to produce the first image in any of the configurations illustrated in FIGS. 12, 13, and 14.

Any one of the applications 810, 830, and 850 illustrated in FIGS. 12, 13, and 14, respectively, may create intermediate model data structures while executing instructions for operating on model data before creating the image definition data 820 defining the image. These intermediate model data structures may be stored in the memory of the machine after the application is complete, and therefore may be accessible to the method of the present invention, or they may be accessible during the application's execution. It is intended that the method of the present invention operate on any of these intermediate model data structures from which the original image may be ultimately produced.

Examples of such intermediate model data structures are illustrated in FIG. 15, in which application 810 is a representative graphical object editing application. Application 810 is composed of processes 812, 814, and 816; processes 812 and 814 produce intermediate data structures 802 and 804. For example, intermediate data structure 804 may be a display list of objects in a graphical image, or it may be a page description file containing instructions in a high-level page description language (PDL), also called a graphics language, describing the device independent appearance of text, graphical shapes, and sampled images on printed pages. Process 816 is then a display list processor or PDL interpreter producing image definition data 820 from which image 180 is directly produced. The method of the present invention, designated as a "viewing operation" 200 in FIG. 15, may operate on any of data structures 800, 802, or 804.

b. Object-based model data structures.

A model data structure from which an image can be produced may be composed of a collection of data items describing "objects". An "object" represents a semantic aspect of an application domain (e.g., letters, words, and paragraphs in a word processor; strokes in a drawing system; temporal events and dependencies in a project management system; etc.). Typically, an "object description data item" in the data structure is itself composed of other data items that describe a set of properties of the object. For a particular object, the properties may represent positional and visual attributes of the object that determine how the object will be perceived when displayed, in addition to application specific attributes used by the application that produced the image. Typically also, each object, along with its properties, is uniquely addressable by a pointer or identifier, and thus objects can refer to each other in their descriptions. Objects or their properties may also describe relations or constraints between other objects. The term "display feature attribute data item" when used in reference to a data item in an object-based model data structure will refer to an object property.

Because the model data structure is organized around object description data items, new objects can be added to the model data structure, to be presented for display at a particular spatial location when the image is produced; an object can be deleted from the model data structure, and therefore from the image produced; and an object can have any one of its properties changed by arbitrary computations. The image produced from such a model data structure may show an object overlapping spatially with another object. For model data structures operated on by an application which presents an editable image, an object can be moved to a new position in space, and the model data structure changed accordingly to have information correctly indicating the new position. Where an application provides for receiving input for performing editing operations, a user may manipulate objects in an image, and the user's input signals, converted to display position information, can be mapped to specific objects in the model data structure in order to allow the user to edit or otherwise manipulate the object-based model data structure.

In one type of object-based model, the object data item descriptions fully describe how objects are to be spatially presented with respect to each other in an image. Such an object-based model data structure is rendered into either a graphics or procedural model data structure, such as the PostScript® (a Trademark of Adobe Systems) page description language, or directly into an image definition data structure (such as a pixel array) in order to guide the display hardware and software to display the objects on the display.

Other types of object-based models do not include data that fully describe how objects are to be spatially presented with respect to each other in an image, and an application that operates on such object-based models must include instructions for laying out the objects in an image. Typically, the application uses some form of object identification data in the model to determine where an object is to be positioned in the image, effectively linking the object to its position. The method of the present invention is intended to operate on models of this type as well. When explicit object position data in the model is not available to link a displayed object in an original image to an object data item in the model that produced the image, the method of the present invention only requires that object identification data linking the object to its position in the original image be available. Such information is typically available from the application.

Figure 16:
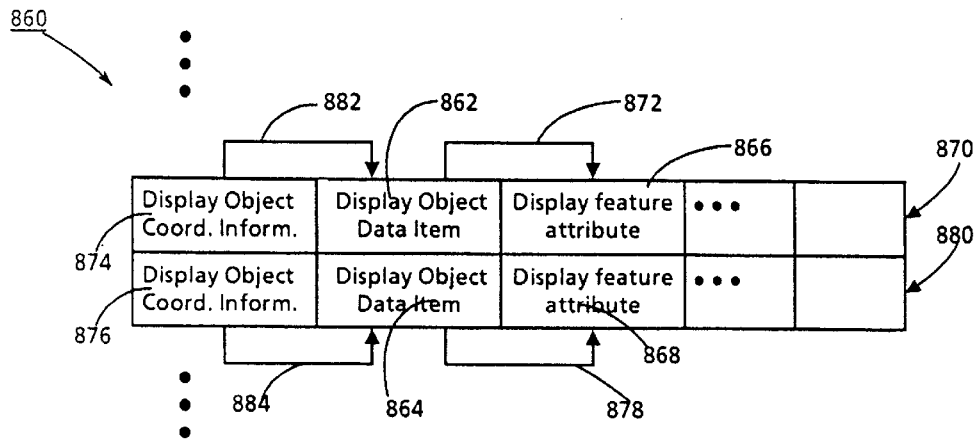
FIG. 16 illustrates the data structure organization of an object-based model data structure on which the method of the present invention may operate.

FIG. 16 illustrates an example of the data structure organization of an object-based model data structure 860 of the type used by the method of the present invention. Object description data items 870 and 880, respectively, each include a collection of data items represented by a display object in an image. Object data items 862 and 864 include information identifying the display objects, and "indicate" or display feature attribute data items 866 and 868 respectively, which contain information about object properties. Each display feature attribute data item has a present attribute value indicating a display feature of the display object when displayed in the display area. For example, display feature attribute data items 866 and 868 could have values for fill colors, outline colors or other visible features of the display objects. Connecting lines and arrows 872 and 878 illustrate the concept that object data items 862 and 864 indicate display feature attribute data items data items 866 and 868 respectively.

The connection between the data items may be implemented using pointers or other linking mechanisms, or by defining the data structure of object description data items 870 and 880 in memory, or in any other manner that accomplishes this connection. First image model data structure 860 also includes object coordinate data items 874 and 876 indicating display object coordinate information about a present object position of the display objects in the image. As shown by connecting lines and arrows 882 and 884, object coordinate data items 874 and 876 indicate object data items 862 and 864. Thus, if the position in the image of the display objects representing object description data items 870 and 880 can be determined, display feature attribute data items 866 and 868 can be obtained from first image model data structure 860.

1. The machine environment

Figure 17:
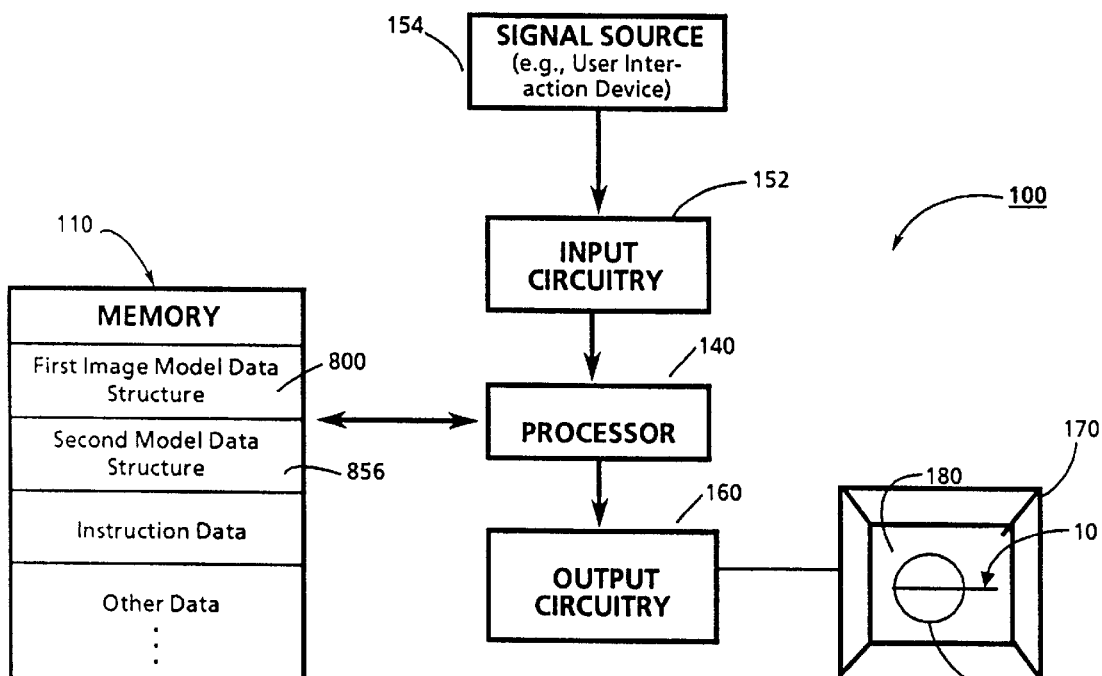
FIG. 17 illustrates a processor controlled machine on which the method of the present invention may operate.

The method of the present invention operates a variety of processor-controlled machines, each of which has the common components, characteristics, and configuration of machine 100 illustrated in FIG. 17. Machine 100 includes input circuitry 152 for receiving input "request" signals from one or more signal sources 154 indicating image display requests. Signal source 154 may include any signal producing source that produces signals of the type needed by the method of the present invention.

Signals indicating user actions may include signals indicating the selection or movement of a display object visible to the user in display area 180, signals indicating requests that result in operations being performed by processor 140, and signals that result in processor 140 providing data defining an image to output circuitry 160 for display in display area 180.

With continued reference to FIG. 17, machine 100 also includes memory 110 for storing data. Processor 140 is connected for accessing the data stored in memory 110, and for providing data for storing in memory 110. Memory 110 stores instruction data indicating instructions the processor executes, including the instruction data indicating the instructions for operating machine 100 according to the method of the present invention.

Processor 140 is also connected for providing data defining the first image 182 to output circuitry 160 for presentation on display device 170 in display area 180. Processor 140 is further connected for providing data defining images, produced according to the method of the present invention, to output circuitry 160 for presentation on display 170 in display. The details of the components, characteristics, and configuration of machine 100 are described more fully in the copending, concurrently filed patent applications listed above.

B. Description of the method of the present invention

1. The initial contents of the display area include a first viewing operation region and a second image displayed therein, showing information about the first image model data structure.

As shown by example in FIG. 17, the method of the present invention operates machine 100 when display 170 has a first image 10 displayed in display area 180. The first image is produced using a first image model data structure 800 which is also stored in memory 110. There is further displayed in display area 180 a first viewing operation region 20 with a second image displayed therein.

Figure 18:
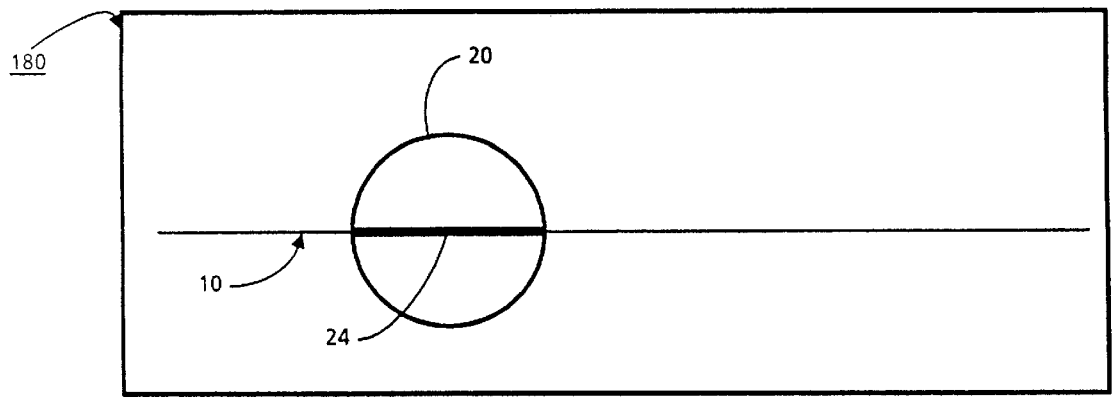
FIG. 18 illustrates a display screen showing the initial contents of a display area on which the method illustrated in FIG. 22 operates.

The initial contents of display area 180 are shown more clearly in FIG. 18. Note that abbreviations used in this description and in the figures are the same as those identified in Table 1 above. Image 10 is a simple black line having a thickness characteristic, or display feature, and having the display feature of being a solid line. Image 10 was produced using a first image model data structure stored in the memory 110 of the processor controlled machine. A first viewing operation region 20 (1VOR) in a first viewing position in display area 180 is displayed coextensively with the present image position of a first image segment of first image 10. The first image segment includes a portion of the black line of image 10.

As described in more detail in the copending, concurrently filed patent applications listed above, 1VOR 20 has a first viewing operation (VO1) associated with it for providing a second image 24 for display in the 1VOR 20 (1VOR-SI) according to a mapping, or function, of an input model data structure, typically the first image model data structure, to the 1VOR-SI. Mappings, or functions, may be defined so as to produce a wide variety of second images including, but not limited to, a second image showing a modified display feature of a display feature in the first image segment; a second image showing the deletion of a display object from the first image segment; a second image showing the replacement of a display object in the first image segment with a different display object; a second image showing the addition of a display object to display objects shown in the first image segment; a second image showing a modified view of the first image segment by changing a global parameter controlled by an application; and a second image showing the results of a selection of a display object in the first image segment according to some criteria defined in the VO1 and matched to data in the first image model data structure.

In the example illustrated in FIGS. 18–21, VO1 modifies the line thickness of lines in a first image. In the illustrated example, a new attribute value for the display feature attribute data item in the first image model data structure that determines the line thickness is obtained and used in place of the present attribute value so that the 1VOR-SI 24 includes the line having the modified line thickness. 1VOR-SI 24 has size and shape dimensions substantially identical to the size and shape dimension of 1VOR 20 and replaces the first image segment in the display area.

Figure 19:
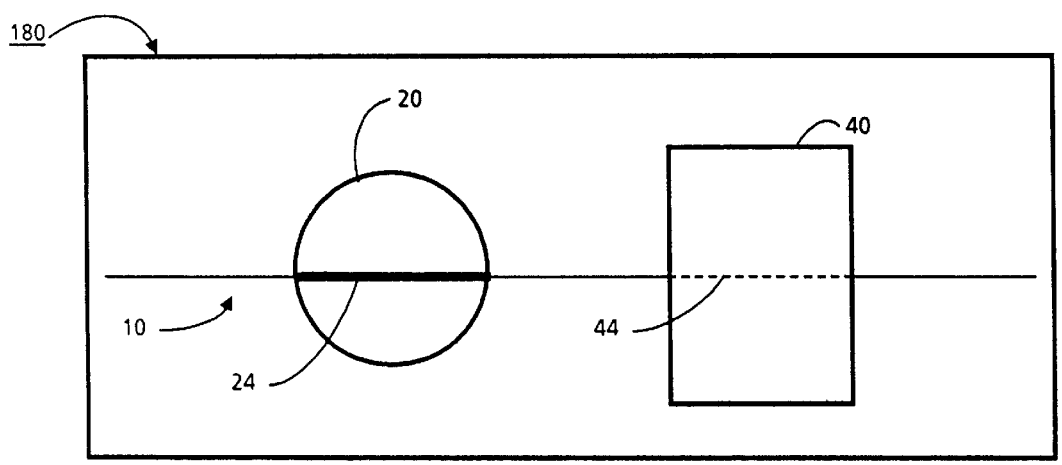
FIG. 19, 20 and 21 illustrate a sequence of display screens showing a composite image produced according to the method illustrated in FIG. 22.

As also described in the copending, concurrently filed patent applications listed above, multiple views of the same original image may be displayed by using more than one VOR positioned over different parts of the original image. FIG. 19 illustrates a second viewing operation region (2VOR) 40 over a different portion of image 10. Note that 2VOR 40 has a different shape than 1VOR 20; in general, a viewing operation region is a display feature perceptible as a coherent unity having at least one distinguishable outline and at least one bounded area. The distinguishable outline defines and distinguishes the portion, or segment, of the first image for which a second image is produced from the remainder of the first image for which a second image is not produced. In the drawings, the exemplary viewing operation regions are illustrated as bounded areas with an explicitly drawn boundary line. However, the viewing operation region may have a topologically complex boundary, need not be a fixed or predetermined shape, and need not have an explicitly drawn border as long as it is perceptible as a coherent, distinguishable bounded area.

2VOR 40 has a second viewing operation (V02) associated with it for providing a second image for display in the 2VOR 40 (2VOR-SI) according to a mapping, or function, of an input model data structure, also typically the first image model data structure, to the 2VOR-SI. As with V01, V02 may map its input model data structure to one of a wide variety of possible second images. FIG. 19 shows the V02's mapping of the first image model data structure to the 2VOR-SI when the 2VOR is positioned coextensively with a second image segment of the first image. V02 changes the "solid" display feature of the black line to that of "broken" to produce a broken black line.

2. Producing the composite second image for display in the composite viewing operation region.

Figure 20:
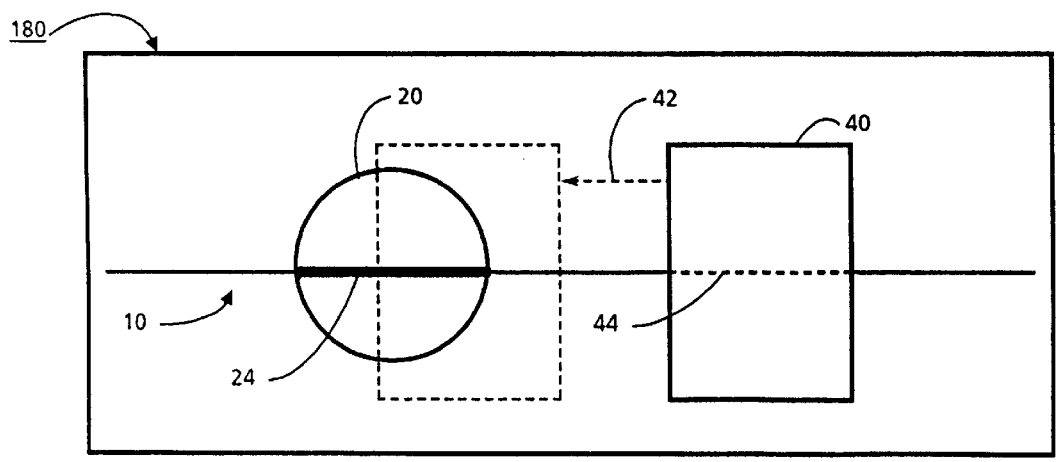
Figure 21:
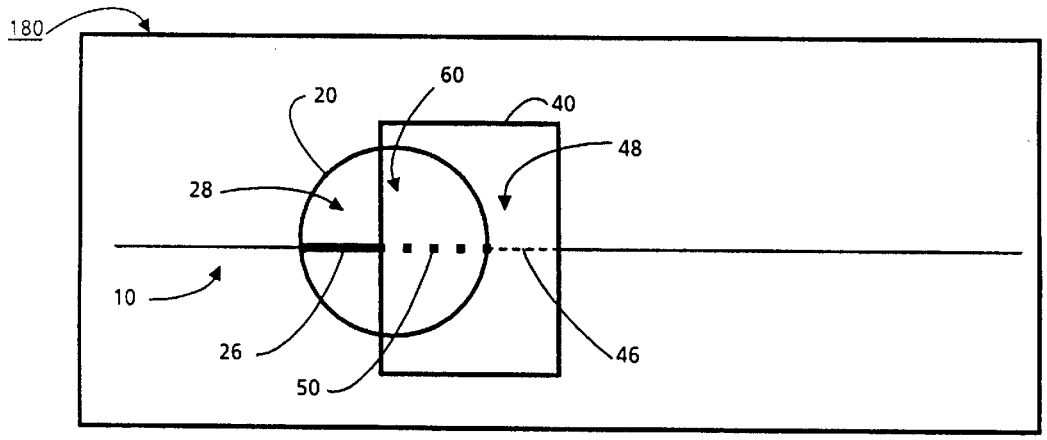
Figure 22:
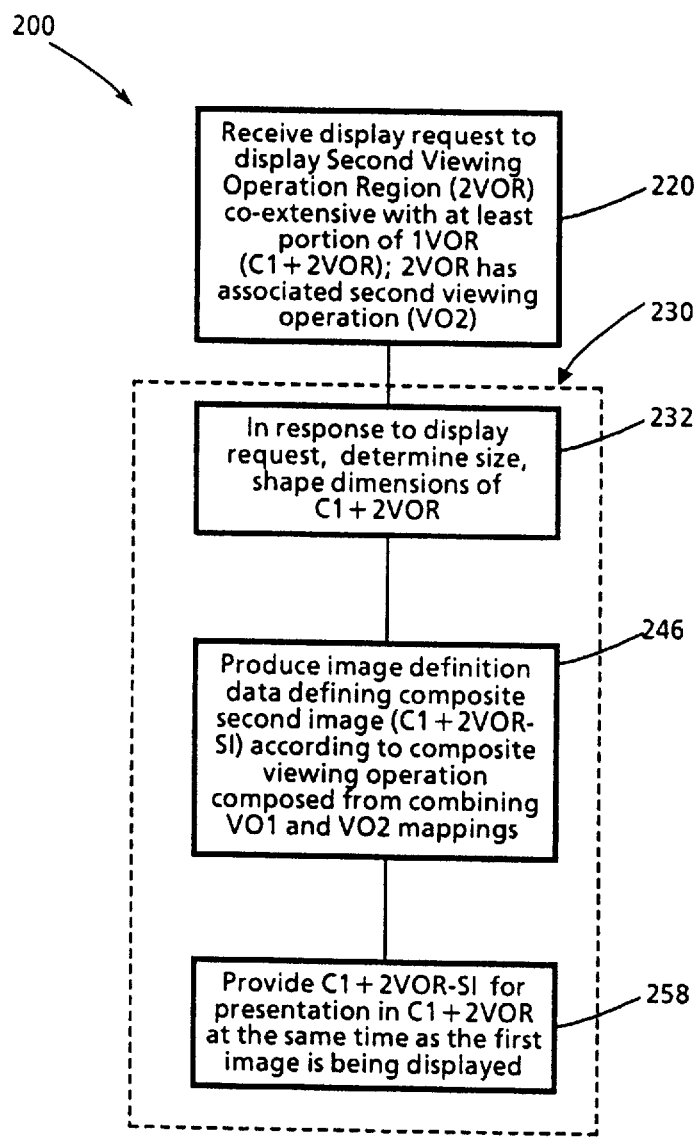
FIG. 22 is a flow chart illustrating the acts of the method of operating a machine according to the present invention.

FIG. 22 illustrates the acts of method 200 of the present invention operating on image 10 to produce a composite second image. Display screens 180 in FIGS. 20–21 illustrate the features of the method. A request to display a second viewing operation region 40 (2VOR) in a second viewing position in display area 180 coextensive with the present image position of a second image segment of first image 10 is received, in block 220.

The second image segment also includes a portion of the black line of image 10.

Since the method of the present invention has been implemented as a user-directed feature of an application in a graphical user interface environment, the request signal received in block 220 may be a user request signal indicating a movement action on the display of the 2VOR 40 from a first position to the second viewing position in display area 180 coextensive with the present image position of a second image segment of first image 10. FIG. 20 shows in dotted lines the user-directed "movement" of 2VOR 40 along path 42 to a position in display area 180 coextensive with at least a portion of the first viewing position of 1VOR 20. Alternatively, the request signal received in block 220 may be a request that initially or directly generates the 2VOR 40 in the second viewing position coextensively positioned with at least a portion of the first viewing position of 1VOR 20.

In response to the request to display 2VOR 40 in a position in display area 180 coextensive with at least a portion of the first viewing position of 1VOR 20, method 200 causes processor 140 to perform the component acts shown in block 230. First, the size and shape dimensions of the portion of 2VOR 40 that is positioned in display area 180 coextensively with the first viewing position of 1VOR 20 are determined, in block 232, using the viewing positions of each respective viewing operation region. This overlapping region, shown more clearly in FIG. 23, will be called hereafter the composite viewing operation region 60, or C1+2VOR 60. These size and shape dimensions are generally determined through simple manipulation of the geometric outlines of the regions. However, in some instances, the function of the V02 may also be a factor in determining the size and shape of C1+2VOR 60.

Next, in block 246, image definition data defining a composite second image (C1+2VOR-SI) for display in C1+2VOR 60 is produced using the size and shape dimensions of C1+2VOR 60, and according to a composite viewing operation that maps the first image model data structure to the image definition data defining the composite image.

The composite second image has the size and shape dimensions of C1+2VOR 60.

The composite viewing operation is produced by combining the mapping or function defined by the V01 on its input model data structure with the mapping or function defined by the V02 on its input model data structure. In the illustrated example, both viewing operation mappings recognize the first image model data structure as a valid input model data structure. How the mappings or functions are combined depends on the particular implementation chosen to accomplish the individual viewing operations, and on the complexity of the individual viewing operations involved.

However, regardless of the specific manner in which the functions are combined, in order to produce a composite image that makes intuitive sense to a machine user of the method, a viewing operation ordering rule must be adopted and adhered to consistently for each composite image produced. That is, whether the mapping of V01 is performed on the first image model data structure before the mapping of V02 is performed on its respective input model data structure, or vice versa, must be determined and applied consistently for all composite viewing operations.

Figure 24:
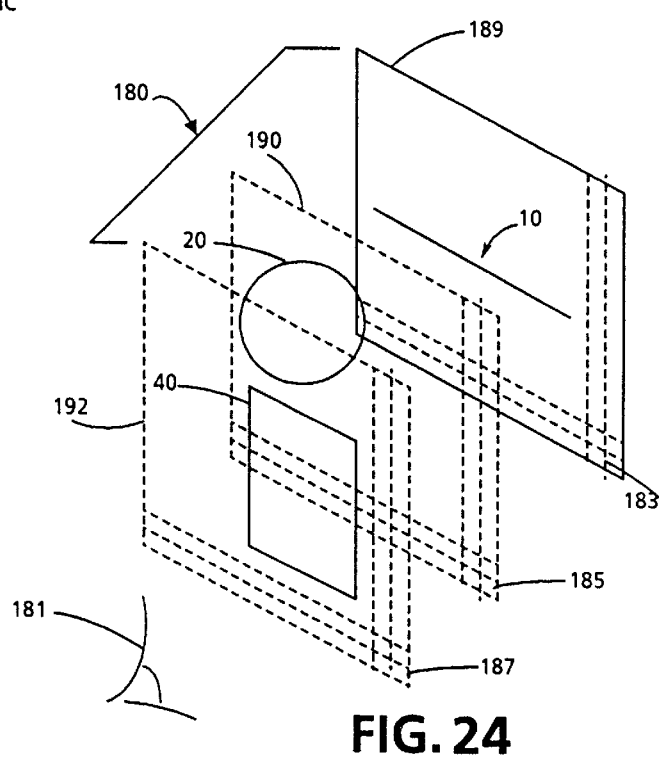
FIG. 24 illustrates three image planes of the display area implemented in the illustrated embodiment.

The viewing operation ordering rule adopted in the illustrated embodiment is related to the two-and-one-half dimensional ("2.5D") appearance of display area 180, illustrated in FIG. 24, showing display area 180 from the perspective of human user 181 having three image planes 189, 190 and 192. First image 10, 1VOR 20, and 2VOR 40 have the appearance in display area 180 of each being in a different image plane, creating the appearance of a 2.5D image display area 180. Image plane 189 shows first image 10, while image planes 190 and 192 show 1VOR 20 and 2VOR 40 respectively. In the illustrated graphical user interface implementation, in which the user directs the movement of 1VOR 20 and 2VOR 40, the user may move first image 10 in image plane 189 "under" 1VOR 20 in image plane 190, or may move 1VOR 20 in image plane 190 "over" a portion of first image 10 in image plane 189. Similarly, the user may move 1VOR 20 image plane 190 "under" 2VOR 40 in image plane 192, or may move 2VOR 40 in image plane 192 "over" 1VOR 20 in image plane 190.

Since each image position 183 in image plane 189 corresponds to an image position 185 in image plane 190 and to an image position 187 in image plane 192, as a result of the user's interaction, 2VOR 40 may be positioned coextensively with a portion of 1VOR 20 and with an image segment of first image 10. The image planes create the appearance of an overlapping order. In the illustrated embodiment, the composite viewing operation is implemented by combining the V01 and the V02 in the overlapping order of their respective viewing operation regions in display area 180, beginning with the viewing operation associated with the viewing operation region closest to the image plane containing first image 10. A particular implementation of a composite viewing operation involving the production of a second model data structure is described in detail below.

Then, in block 258, the image definition data defining the composite second image is provided to the output circuitry connected to display 170 so that display 170 presents the composite second image in the C1+2VOR in display area 180 substantially at the same time as the first image is being displayed in display area 180. FIG. 21 illustrates composite image 50 in C1+2VOR 60. V01, which changes the thickness of the line in image 10 to a thicker line, is combined with V02, which changes solid lines to broken lines, are combined to produce a broken, thicker line in composite image 50, thus giving the perception to the machine user of showing the results of applying the composite viewing operation to information presented in the first image segment.

3. Producing non-composite images for display.

Figure 23:
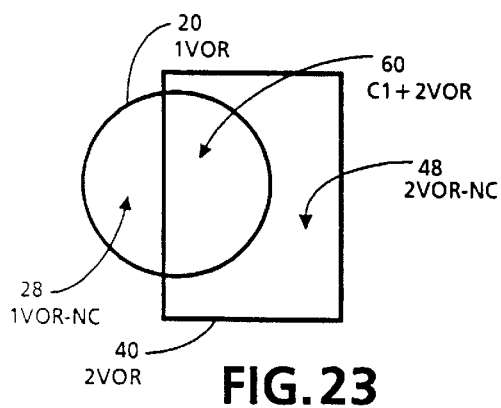
FIG. 23 illustrates the portions of VORs defined by coextensively positioning two VORs.

It can also be seen from FIGS. 21 and 23 that, in addition to C1+2VOR 60, other viewing operation regions are created when 1VOR 20 is positioned coextensively with 2VOR 40. The method of the present invention recognizes that a machine user will derive additional benefit from the method when the second images defined by the individual mappings, V01 and V02, of the first image model data structures are also produced and displayed in display area 180 in these other regions. The operation for displaying the non-composite portions is discussed in detail in the commonly assigned co-pending applications especially Ser. No. 08/096, 193, now U.S. Pat. 5,479,603.

4. Composing viewing operation regions using a second model data structure.

A specific implementation of composing viewing operations involves producing a second model data structure as the output of a viewing operation that is first in the order of composition using the first image model data structure, and then providing that second model data structure as the input to the viewing operation second, or next, in the order of composition. The second model data structure contains the necessary data items from which the second image for the first viewing operation is produced Thus, applying the second viewing operation to the output data structure of the first viewing operation has the effect of composing the viewing operations and applying the composite operation on the first image model data structure.

Figure 25:
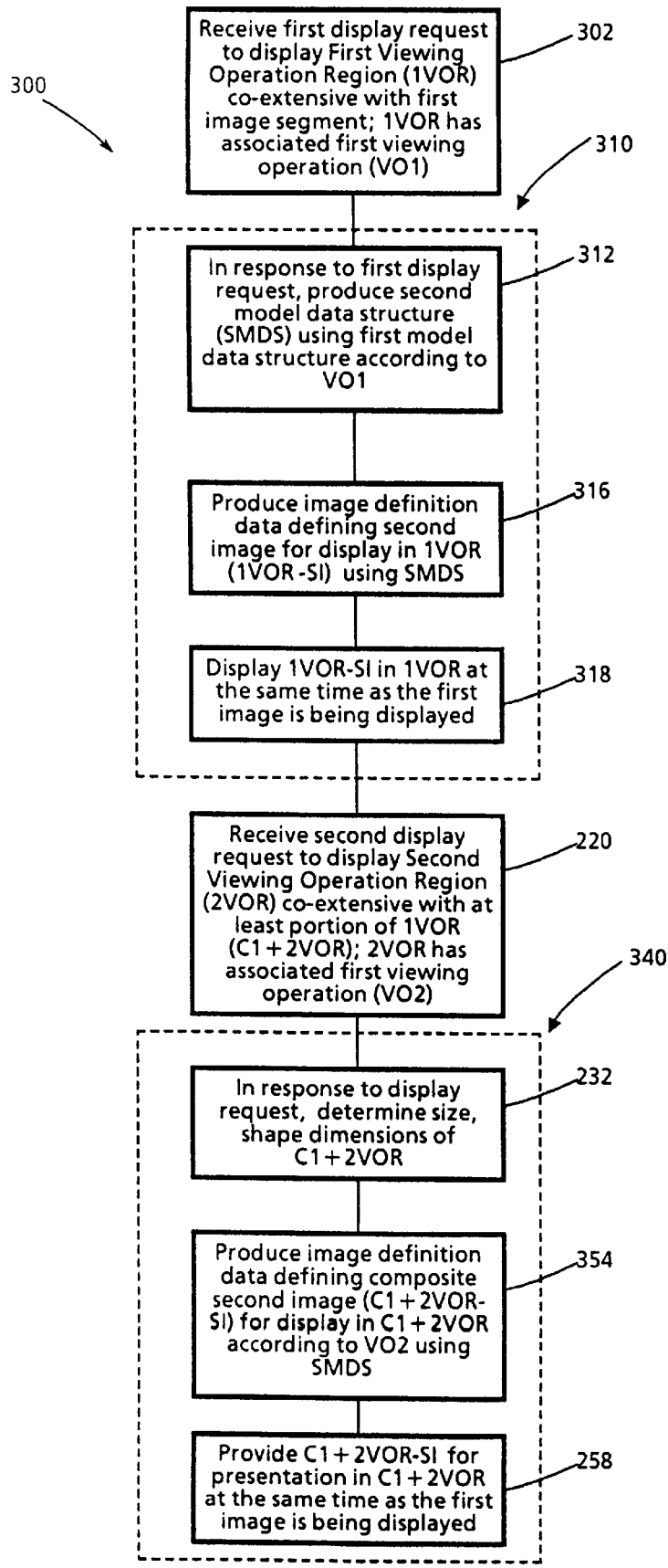
FIG. 25 is a flow chart illustrating the acts of another implementation of the method of the illustrated embodiment.
Figure 26:
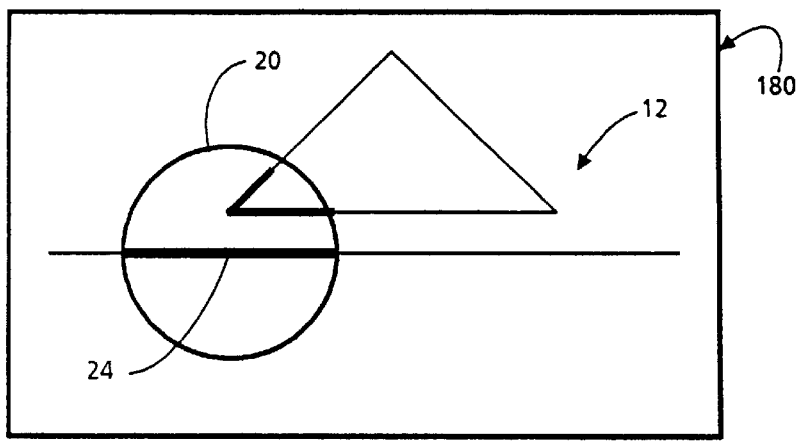
FIG. 26 illustrates a display screen showing the first image and a second image produced according to a first viewing operation for a first VOR.
Figure 27:
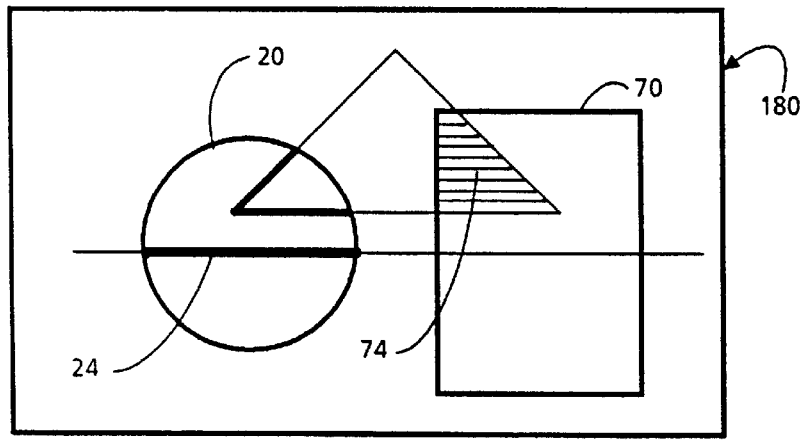
FIG. 27 illustrates a display screen showing the first and second VORs, each having second images, produced according respective first and second viewing operations; and, FIG. 28 illustrates a display screen showing the results of composing the first and second viewing operations illustrated in FIGS. 26 and 27 according to the method illustrated in FIG. 25.
Figure 28:
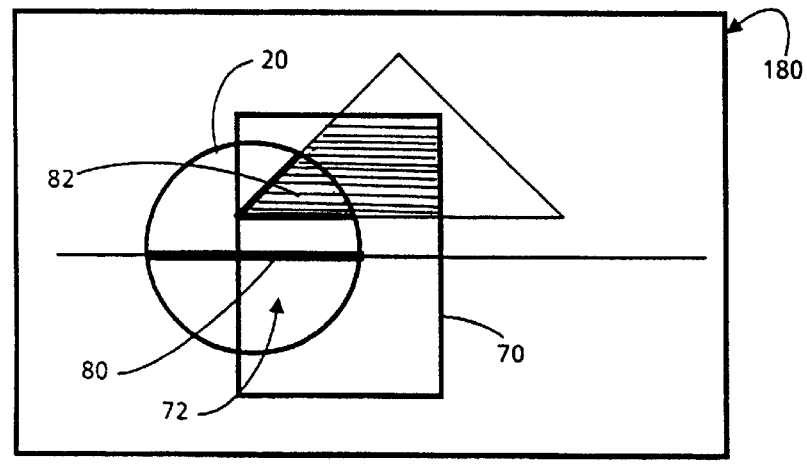

FIG. 25 illustrates the acts involved in this "model-in model-out" implementation, denoted as method 300. FIGS. 26, 27, and 28 illustrate a series of display screens showing the operation of method 300. A first request signal is received, in block 302, to display first viewing operation region 20 (1VOR) in a first viewing position in display area 180 coextensively with the present image position of a first image segment of first image 12. The first image segment includes a portion of the black line and a portion of the triangle of image 12. 1VOR 20 has a first viewing operation (V01) associated with it for providing a second image 24 for display in the 1VOR 20 (1VOR-SI) according to a mapping of the first image model data structure to the 1VOR-SI. V01 is the same viewing operation described earlier, that of changing the thickness of lines in an image.

In response to the first display request signal, the component acts in block 310 are performed. A second model data structure is produced, in block 312, according to the V01 and using the first image model data structure. In the example shown, the first image model data structure, including the display feature data items represented by the lines and the thickness of the lines in image 12, is copied to a second model and the appropriate copied display feature data items are changed to have the new value of an increased thickness. Then, in blocks 316 and 318, image definition data defining the 1VOR-SI 24 is produced from the second model data structure and displayed in 1VOR 20, as shown in FIG. 26.

A second viewing operation region, 2VOR 70 also has a viewing operation (V02) associated with it for providing a second image for display in the 2VOR 70 (2VOR-SI) according to a mapping of the first image model data structure to the 2VOR-SI. FIG. 27 illustrates the 2VOR-SI in 2VOR 20. The V02 changes the color of triangular objects in the image to blue, designated by the fill-in pattern shown in FIG. 27 in the portion 74 of the triangle in image 12 that is within the boundary of 2VOR 70.

Producing the composite image is illustrated in blocks 220 and 340, and shown in FIG. 28. A second request signal is received, in block 220, to display 2VOR 70 in a second viewing position in display area 180 coextensively with a portion of the first viewing position of 1VOR 20. In response to the second display request, method 300 causes processor 140 to perform the component acts shown in block 340. First, the size and shape dimensions of the composite viewing operation region 72, or C1+2VOR 72 are determined, in block 232, using the first and second viewing positions of each respective viewing operation region.

Next, in block 354, image definition data defining the composite second image for display in C1+2VOR 72 is produced according to the V02 using the second model data structure as input to V02, and using the size and shape dimensions of C1+2VOR 72. In the illustrated example, the V02 operates on the second model which has data items represented by thicker line segments in 1VOR-SI, and accesses the triangle object data item and its fill-color attribute data item in order to perform the V02. The resulting composite second image has the size and shape dimensions of C1+2VOR 72. Then, in block 258, as in previously described method 200, the image definition data defining the composite second image is provided to the output circuitry connected to display 170 so that display 170 presents the composite second image in the C1+2VOR 72 in display area 180 substantially at the same time as the first image is being displayed in display area 180.

5. Viewing operation regions implemented to visually formulate database queries.

The preceding discussion, discloses generation of a composite second image for display in the spatial context of a first displayed image by operating on the model data structure 860 from which the first displayed image was produced, and using two or more displayed viewing operation regions VORs for identifying the relevant portions of the image for which the composite second image is to be produced.

The above disclosure has been particularly directed to graphical representations of displayed figures. In this section, the above teachings are extended so the VORs may be used to visually formulate database queries. Mechanisms are provided which allow the user to supply parameters to the composite viewing operation (246 of FIG. 22). For example, by constructing, as the mechanism, an AND/OR mode switch associated with a viewing operation region (VOR), it is possible to interactively control which type of composite viewing operation is performed. As an example, having a bottom lens and a top lens, when the top lens has its mode switch set to AND, a conjunctive query is constructed. On the other hand, when the mode switch of the top lens is set to OR, a disjunctive query is constructed. The power of such query construction is increased by expanding the composition mode beyond AND and OR to any binary boolean operator and to any unary boolean operator including NOT. By stacking a plurality of VORs which each modify the display, a complex boolean query is generated.

It has further been found that by implementing a grouping construct, it is possible to replace a set of stacked VORs with a single compound VOR which duplicates the combined functions of the stack. This form of grouping may be equated to the use of parenthesis in boolean expressions.

It has also been found that the power of the database queries may be extended by providing the queries with real-valued responses in place of boolean type responses. In particular, instead of assigning a True/False grade to each datum, the queries may assign a grade in the range of (0 . . . 1). For this use, the composition modes AND, OR, etc. are replaced with real-valued analogs, MIN, MAX, etc.

By providing conjunction/disjunction, negation, and grouping it is possible to generate any boolean query. Further, by extending this concept to real-valued results, it is possible to perform arithmatic operations on the database and to generate statistical and fuzzy queries.

Figures 1A, 1B:
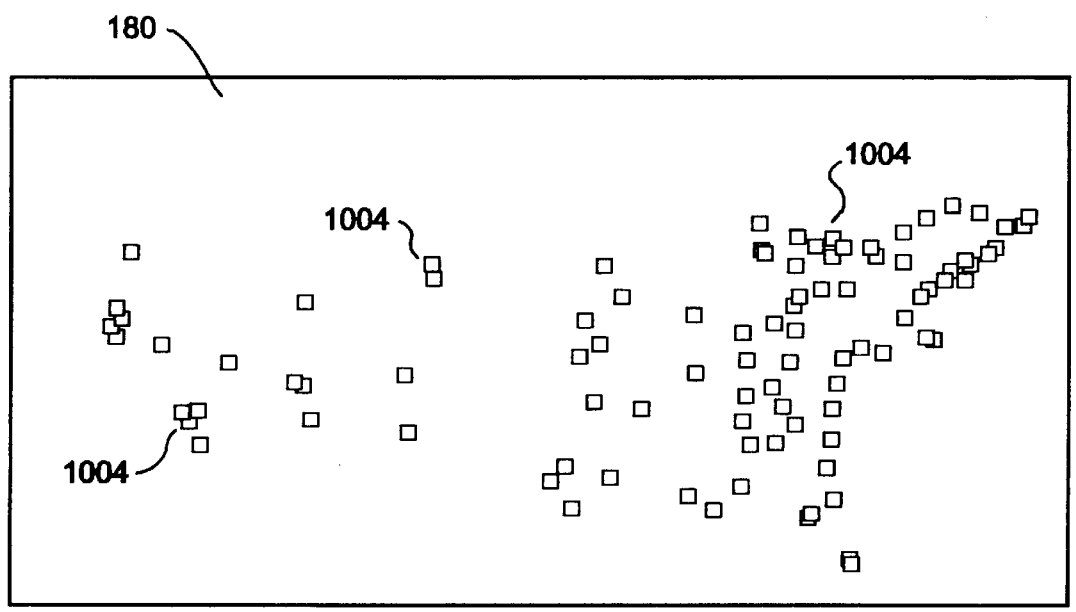
FIG. 1A illustrates the data structure organization of a U.S. census database on which the method of the present invention may operate.
FIG. 1B illustrates a scatterplot type display representing the data in the database of FIG. 1A.

FIG. 1A illustrates a database structure 1000 which may be used in conjunction with the VORs of the subject embodiment. Particularly, as depicted in FIG. 1A, the database is structured having, for example, rows of objects 1001, each object having associated with it a plurality of attributes 1002 placed in corresponding columns. In this figure, and in the following discussion, a United States census database is used. Therefore, an object in the database are cities (i.e., Washington D.C., San Francisco, etc.), and each city has a plurality of data attributes 1002 (i.e., crime index, poverty index, median home prices, etc.).

As shown in FIG. 1B, the objects 1001 of the database are displayed on a display area 180 as boxes 1004. The graphical representation of the objects 1001, i.e. boxes 1004 are displayed on the display area 180 in a manner previously discussed in preceding sections of this paper. Particularly, the boxes 1004 on the display area 180 can be generated according to a data structure such as model data structure 860 (FIG. 16). For instance, the location of the boxes 1004 on the display area correspond to the coordinate information 874, 876, and the size, shape, color etc. of the boxes will correspond to the display feature attributes 866, 868, etc. Data in the image model data structure 860 of FIG. 16 is linked to data in the database structure 1000 of FIG. 1A through known linking techniques; particularly, pointers, etc. can be used to link the data of the structures, or the data may be integrated into a single structure.

In this embodiment, each VOR is generated as an X-window such as described for example in, *Xwindow system*, Digital Press, Bedford, Mass. 1998, by Robert W. Scheifler, James Gettys, and Ron Newman. A VOR manager server extends the X-window system to support the VOR functionality required in the subject embodiment. Therefore, the VORs can be manipulated using the regular window manager interface. It is also possible for the VORs to display their output using the Xgraphics library or, upon request, they can display it in PostScript® (see PostScript Language reference manual, Second Edition, Addison-Wesley, 1990, "PostScript" is a trademark of Abode Systems, Inc.). It is to be appreciated that while a VOR is described as being generated according to the above system other systems may also be used for such generation.

a. VOR construction

Figure 2:
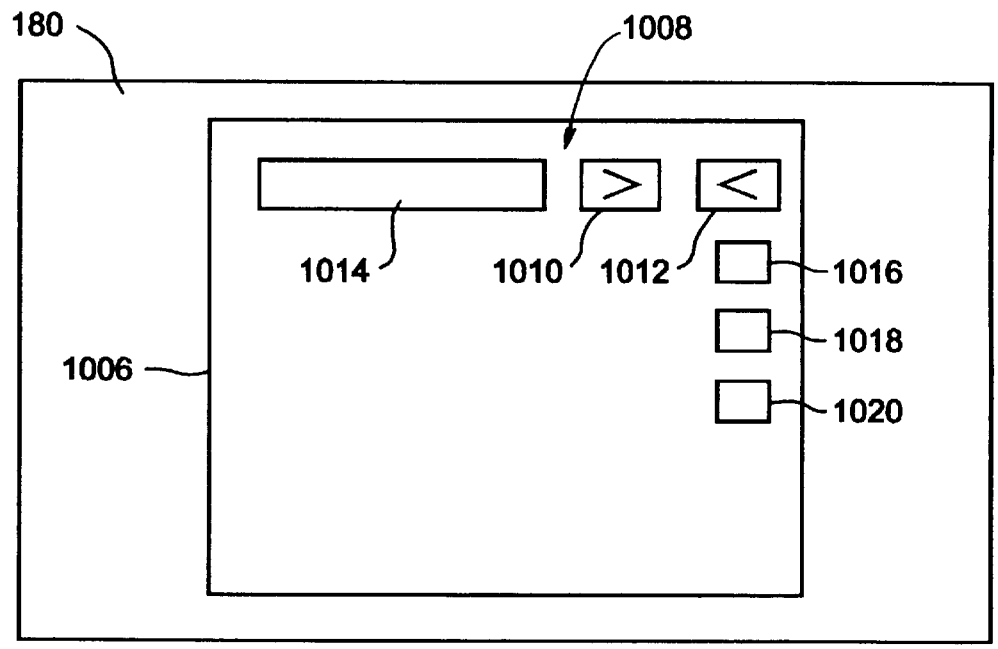
FIG. 2 discloses a viewing operation region (VOR) or lens with interactive interfaces according to the subject invention.

In the above environment, a set of VORs are used to create dynamic queries concerning data in the database. Each of the VORs act as a filter that screens for some data attribute. By providing a mechanism which allows interactive adjustment of the VORs, the power to create database queries is greatly enhanced. As shown in the VOR 1006 of FIG. 2, a slider interface 1008 is provided to control a threshold of numeric data. A greater than (>) selector 1010; or a less than selector (<) 1012 can be operated by a user to increase or decrease the numeric threshold value in threshold display 1014. Composition mode switches 1016–1020 on the VOR are used to control functions such as the generation of the AND and OR modes of VOR 1006.

When VORs constructed in this manner overlap, their operations are combined, providing a model for building up complex queries. The concepts of combining the functions of VORs has been discussed in the preceding sections of this document and in Ser. No. 08/429,376. Using this physical, rather than merely conceptional composition appeals to existing user intuitions that spatial overlaps imply a composition, as shown in Venn diagrams and color circles, etc.

It is to be appreciated that providing slider interface 1008 and composition mode switches 1016–1020 associated with a VOR, "on-the-fly" or interactive manipulation of the VOR is possible.

A VOR of the subject invention is defined as having a filtering function and a composition mode which describes how the result of the filtering function is combined with the output of another VOR. More particularly, a VOR is described as L=(F,M), where F is a filter function and M is a boolean operator. The filtering function F, describes the output calculation for the filter on some data. The mode, M, describes how that output is combined with the output from a lower VOR filter. For example, given L1=(F1, OR) and L2=(F2, AND), the result of graphically positioning L1 over L2 is (F1 OR F2) Conversely, the effect of positioning L2 over L1 is (F2 AND F1) The NOT operation is encoded as a VOR whose filter inverts the sense of the data coming in. Using the formalism of the previous paragraph, an inverting VOR is described as N=(NULL, NOT). That is, N applies a NOT to the output of lower filters, and has no intristic filter function (i.e., NULL). For example, consider the query (F1 OR NOT F2), where F1 and F2 filter for various attributes. To implement this query, the user would initially position the VOR with filter F2, then the VOR with the NOT filter N and then the VOR with filter F1 with its composition mode set to OR.

Figure 3:
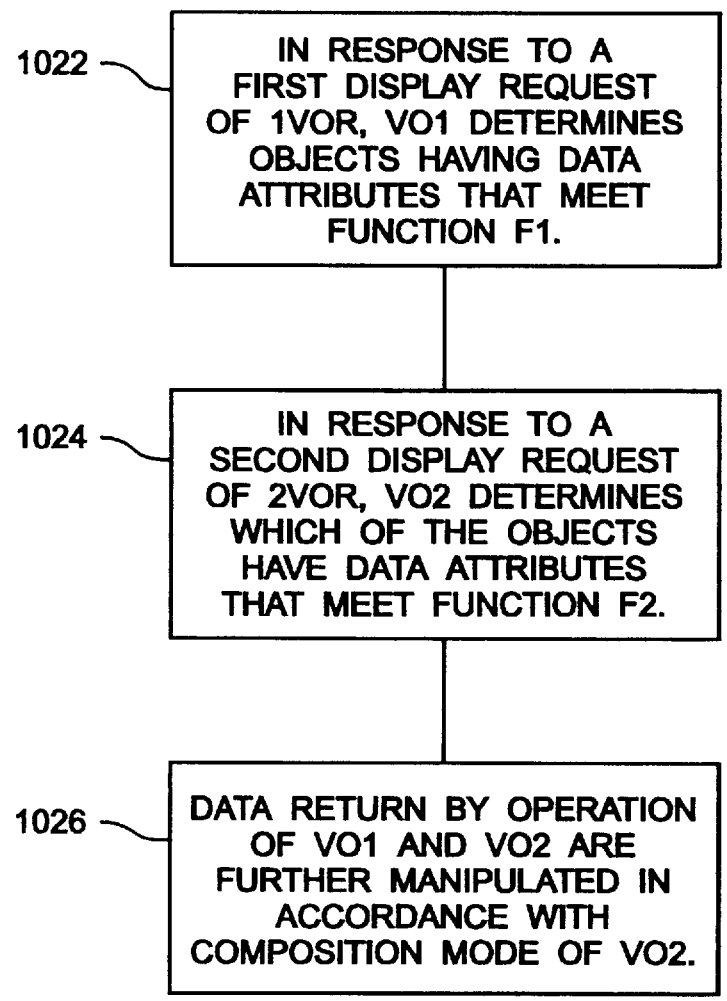
FIG. 3 is a flow chart illustrating the acts of the viewing operations and a composition viewing operation for combining data of the database of FIG. 1A.

In the previous discussions, the composite viewing operation 246 in FIG. 22 generates a composite second image (C1+2VOR-SI) according to the composite viewing operation 246 which combines V01 and V02 mappings. In the present embodiment, the operations of the V01, V02 and composite viewing operation 246 are expanded upon. Particularly as noted in FIG. 3, in response to a first display request of 1VOR, V01 determines which of the objects have data attributes that meet the filtering characteristics F1 (i.e. query) of 1VOR block 1022. Then in response to a second display request of 2VOR, V02 will perform a similar operation and return data attributes meeting the filtering characteristics F2 (i.e. query) of 2VOR block 1024. Next the data returned by the filtering characteristics of V01 and V02 are further manipulated in accordance with the composition mode of V02 block 1026, which in this discussion is a boolean operator (though other types of operators may also be used). The result of operation according to the composition mode are used to alter the display feature attributes of boxes 1004. By changing the graphical representations of the boxes (i.e. objects) located on the screen visual responses to the queries is achieved.

b Grouping of VORs

Figure 4:
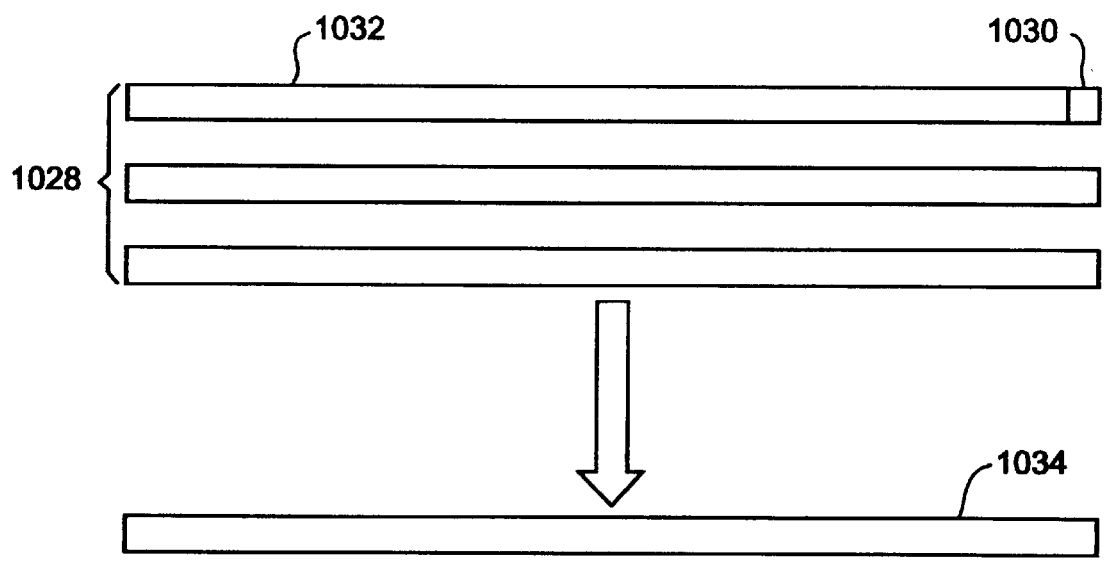
FIG. 4 graphically illustrates the generation of a compound lens.

To expand the searching power of dynamic queries using VORs, it is valuable to incorporate grouping constructs of the VORs. As previously noted, VORs may be graphically stacked one upon the other. By using this stacking, it is possible to generate complex database queries. Grouping results in a single compound VOR that is semantically equivalent to a stack of VORs. As illustrated in FIG. 4, a user may create a compound lens by selecting a point on a stack of VORs 1028 using a grouping click-through button interface 1030, which is partially transparent on an overlying VOR 1032. All VORs beneath this point are combined to create a compound VOR 1034 that generates the same query as the stack 1028. The resulting compound VOR 1034 will also have a composition mode that defines how it is combined with other VORs. This grouping is accomplished, for example, by storing in the memory of the machine the results of the composite viewing operation 246 when the grouping click-through button interface 1030 is actuated.

The compound VOR 1034 can be manipulated by the user just an any other VOR, thereby providing a simple way to encapsulate a complex query into a single conceptual unit. Rr example, to create the query (F1 AND F2) OR (F3 AND F4), a compound VOR is generated for values in the parentheses: (C1=F1 AND F2) and (C2=F3 AND F4). By giving VOR C1 a composition mode of OR, the desired expression can be created by positioning C1 over C2. It is to be noted that compound VOR may contain other compound VORs, thereby allowing queries to grow to an arbitrary complexity.

By incorporating AND, OR, NOT and grouping capabilities, it is possible to represent any boolean query. Complex queries can be incrementally built up by direct manipulation of a VORs and their composition modes. Useful queries can be saved as compound VORs and used to build up more complex queries in a completely uniform manner. While the present discussion has implemented only three common boolean composition modes, the subject invention will support any boolean operation.

c. Using VORs with filtering characteristics and boolean composition modes to create dynamic queries.

As previously discussed, the above described VORs can be used to create an application to browse a database, for example, of U.S. census data. In the U.S. census database of FIG. 1A, each row represents a city (i.e. an object) and the columns describe the city according to various census categories such as population, crime rate, property tax, etc (i.e. data attributes)

Figure 5:
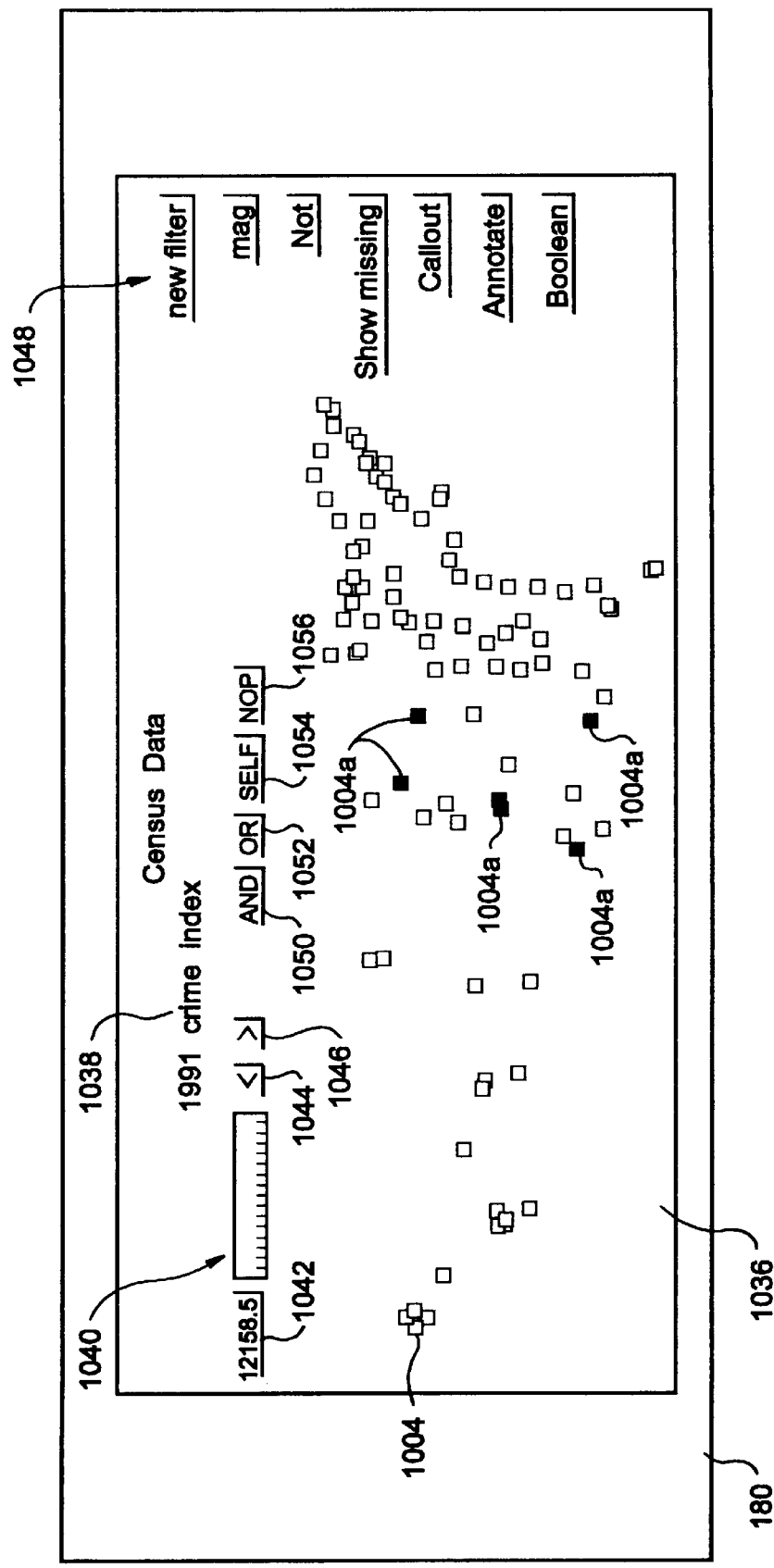
FIG. 5 is a scatterplot type display of the data from a U.S. census database, with cities displayed as boxes at a point proportional to their longitude and latitude, and a VOR filter screening for cities with a high crime rate.

FIG. 5 illustrates the operation of a typical VOR in this embodiment. The cities in the database are displayed in display area 180 as boxes 1004 at points proportional to their latitude and longitude. The data attribute associated with the VOR filter 1036 covering the center of the United States, (i.e. 1990 crime index) is displayed as a window header 1038. Below that on the left is a slider 1040 used to control the threshold value of the query, and a label 1042 which shows a current slider value (12158.5 in this example). The buttons 1044–1046 to the right of the slider 1040 control whether the user is screening for data less than (<) 1044 or greater than (>) 1046 the slider value. Cities shown as filled in boxes 1004a rather than as empty boxes pass the filter. For instance, cities in the center of the country with a crime rate greater than 12158.5 are shown as solid boxes 1004a. Buttons 1048 along the right edge of the application are used to generate new VORs, and for application housekeeping. Composition mode buttons 1050–1056 allow for interactive alteration of the selected composition mode of VOR 103.

An alternative interface for setting the composition mode is to use a click-through tool. In this interface, a single button on the VOR indicates the current mode. The click-through tool contains buttons that can be used to change the mode by clicking through them to the VOR below. The advantage of this interface is that it supports a large set of composition modes without visual clutter. A disadvantage is that it requires more steps to change the modes. The subject embodiment will support both interfaces.

Figure 6A:
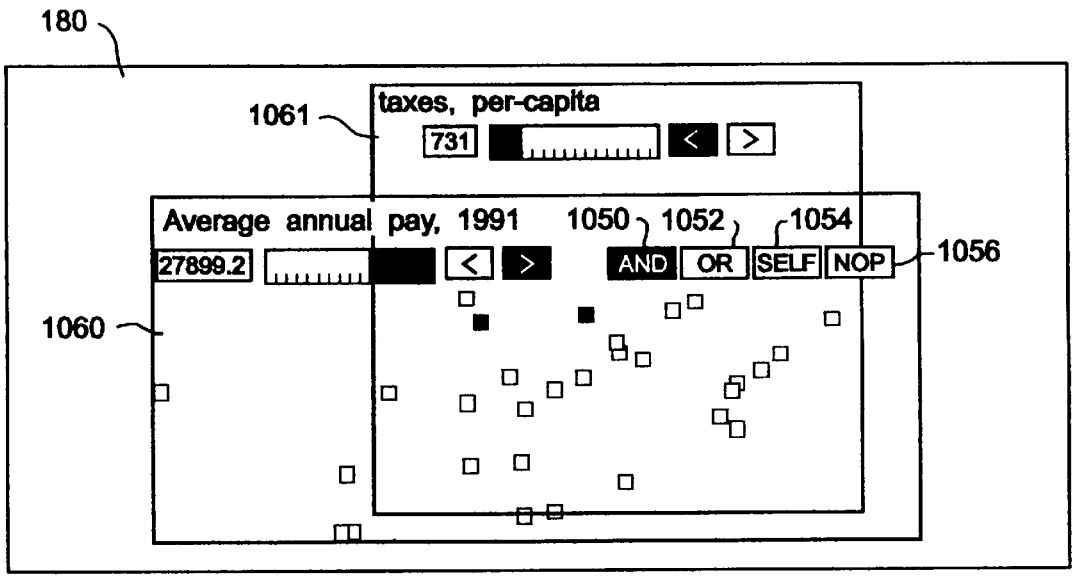
FIGS. 6A and 6B show alternative views of overlapped viewing operation regions implementing boolean expressions.
Figure 6B:
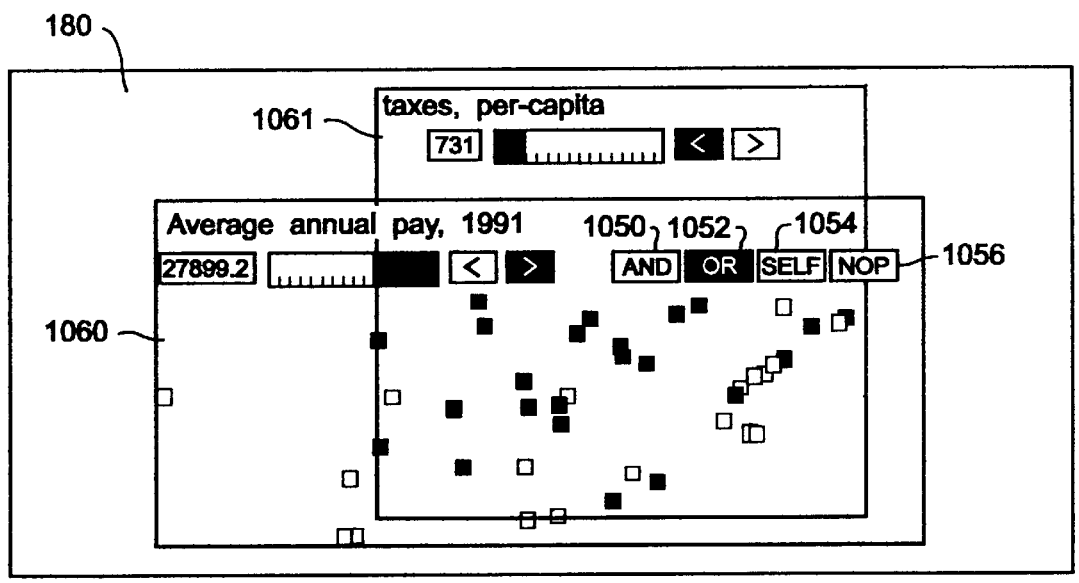

FIGS. 6A–6B illustrate the effects of applying different composition modes to the composition of two VOR filters 1060, 1061. The composition mode for a VOR 1060 is defined by a group of four buttons AND 1050, OR 1052, SELF 1054 and NOP 1056. The buttons labeled AND and OR set the composition mode accordingly. The SELF button causes the VOR to display only the effect of its own filter, ignoring other VORs, and the NOP button sets the filtering function to NULL, disabling the effect of the VOR. The last two modes are useful when interpreting complex queries.

In FIG. 6A a query is made for cities which have high annual salaries and low taxes. This query can be made less demanding by having an operator change the composition mode to OR simply by clicking to the button in a conventional manner, i.e. using a mouse etc. Changing the composition mode to OR causes a query as illustrated in FIG. 6B, to see which cities have either high salaries OR low taxes. The SELF and NOP buttons can be used to examine these components separately, to determine which cities have high salaries and which have low taxes.

Simultaneous multiple queries are performed by positioning different VORs over different parts of the display area. Independent customization of each VOR, and hence each query is accomplished by manipulating the control on the VOR. Alternative views of the data, such as magnifying VORs, callouts, sort-views and other such transformations are generated by the VORs. The user interface of these visual transformations is identical to that of the semantic transformations (i.e. filters).

Figure 7:
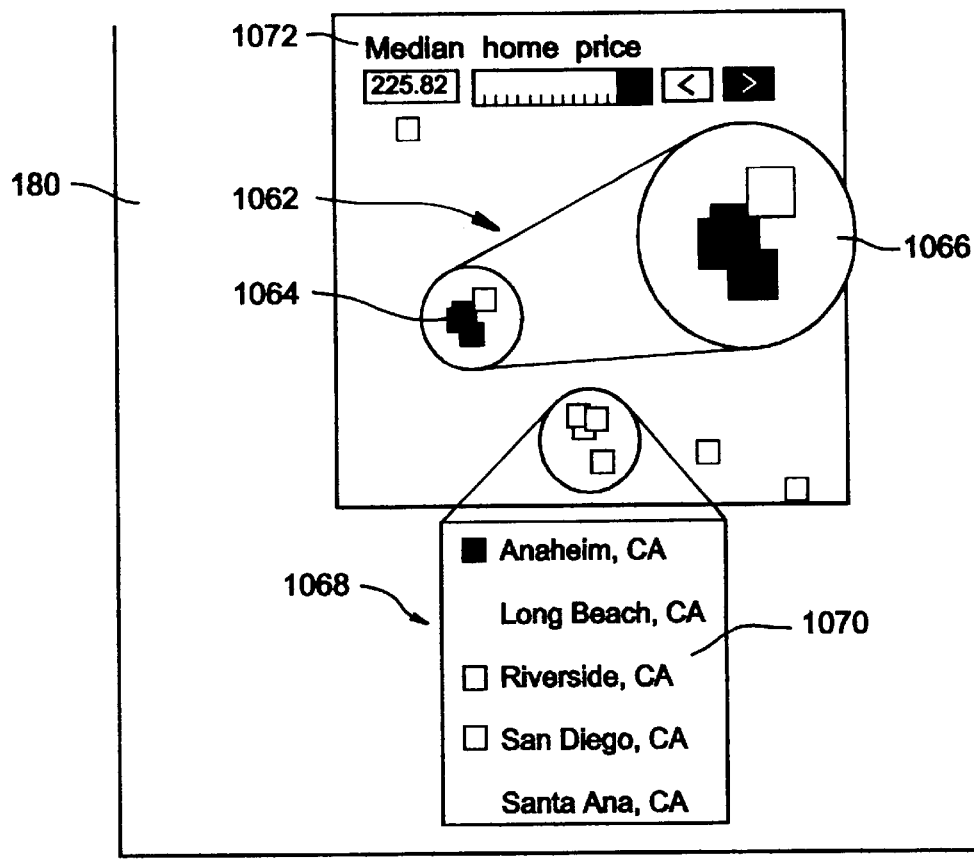
FIG. 7 illustrates a VOR with semantic filters augmented with VORs with visual filters, the visual filters being a magnification filter and a call-out filter.

An example of simultaneous multiple queries is depicted in FIG. 7. It is known that in scatterplot type representations of data, often clumps will form where some set of data points map to nearby points on the display or even overlap. FIG. 7 includes such examples of this clumping and a use of multiple visual filters to aid in viewing the data. A small magnification VOR 1062 has its explicit input region 1064 positioned over an area of Northern California, letting a viewer see in an explicit output region 1066 that there are four cities in the San Francisco Bay area. A separate VOR 1068 is displayed over Southern California. The explicit output region 1070 displays the cities as a list, making it easy to distinguish these cities The rest of the map is displayed in the usual manner. This manipulation allows easy identification of cities in a dense region while maintaining global context. The boxes next to the city names in the call-out are active, so filters placed over them act exactly as if they were placed over the original map. Cities listed without boxes are missing the data selected by the filter; "median home price" 1072.

Figure 8:
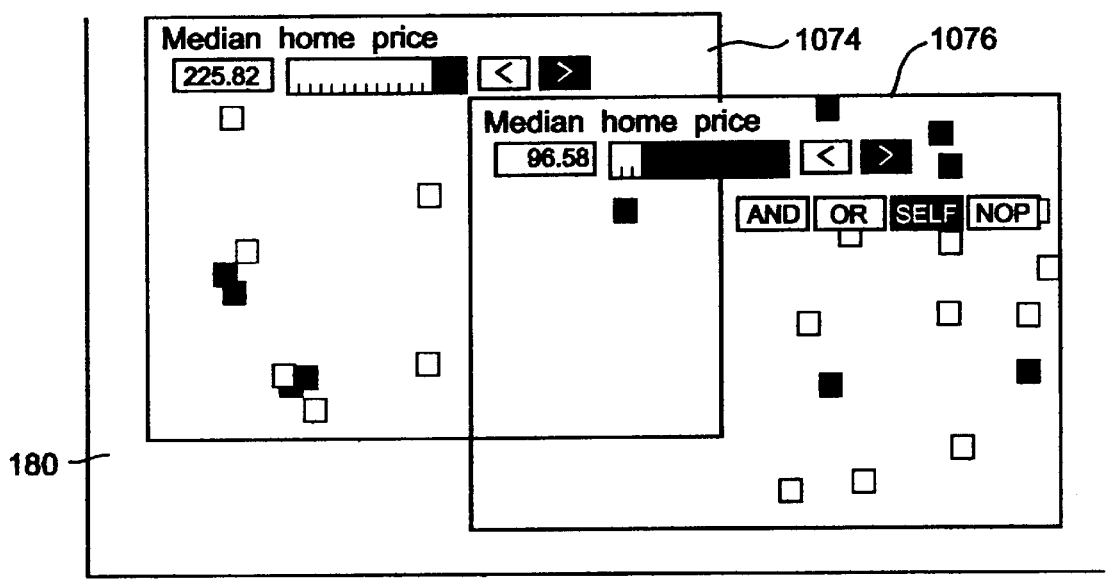
FIG. 8 illustrates VOR filters and the operation of a slider interface associated therewith.

When the subject invention is used with a scatterplot data representation, a user may manipulate a set of selectors, and observe their filtering effect on the data. By associating each selector with a single moveable filter, it is possible to have multiple simultaneous queries, each with its own set of parameters. As depicted in FIG. 8, two separate filters 1074–1076 are positioned over portions of California and Texas. The function of each filter is directed to median home prices. VOR 1074 positioned over California has a median home price of 225.82 whereas the median home price of VOR 1076 over the section of Texas is 90.58. As can be seen by these filters, using the sliders on the top of the VOR along with the greater than (>) and less than buttons (<) the selection of the range of desired median home prices can be adjusted. Therefore, if the query is "what cities in each region of the country have relatively low housing prices", the adjustable nature of the slider allows obtaining this information.

By providing the movable VOR filters with interactive mechanisms including sliders, and various boolean composition modes, and by providing for the grouping of the VORs, it is possible to visually generate complex boolean database queries and responses. The database queries are visualization systems which provide an intuitive feel for the scope of data being searched.

d. VORs used for real-valued queries and undefined data values

In addition to using the subject invention for boolean type queries, the VOR filters can be extended to support real-valued queries and undefined data values.

To support real-valued queries, the system is extended such that VOR filters assign a real-valued score in the range of (0 . . . 1) to each datum. Data with a score of zero (0) fails the filter entirely, data with a score of one (1) succeeds entirely, and data with intermediate scores partially satisfy the filter. Such an arrangement provide more detailed information about the value returned by a query. The general scoring function can be arbitrary, i.e. a filter may prefer data with extreme values, or assign a gaussian fall-off to data with the highest score going to data of a certain value, or other similar metrics. The embodiments presented are directed to linear and step scoring functions, but this is not due to any limitation imposed by the technique. The value of a returned datum is visually shown by each datum as being a partially filled in box, with the higher the score, the more of the box being filled in.

Figure 9A:
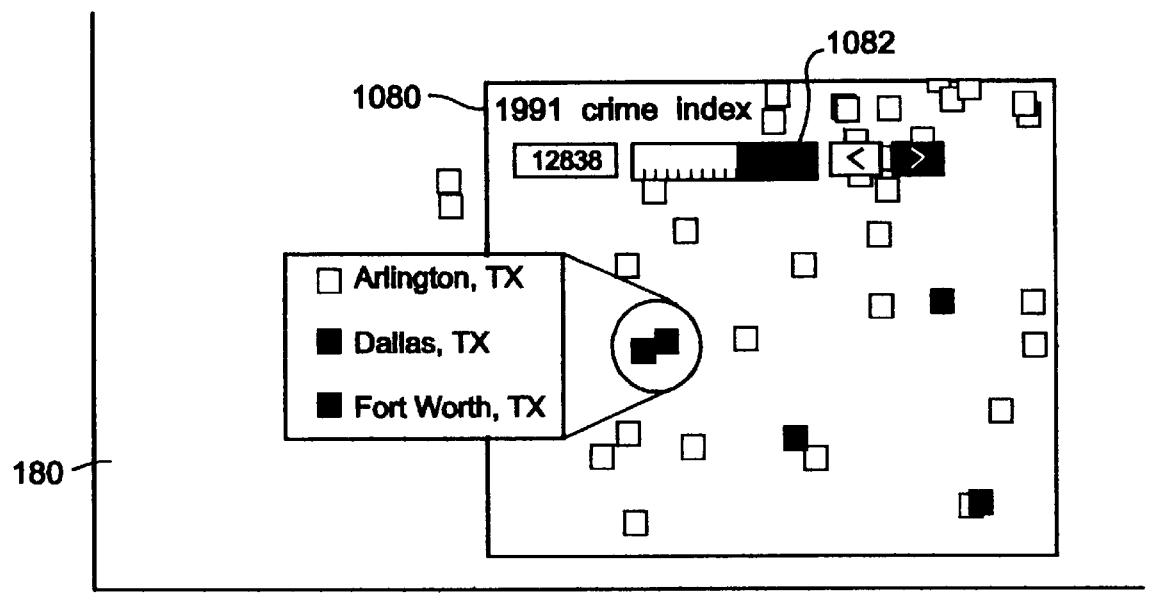
FIGS. 9A and 9B show VORs operating with real valued queries.
Figure 9B:
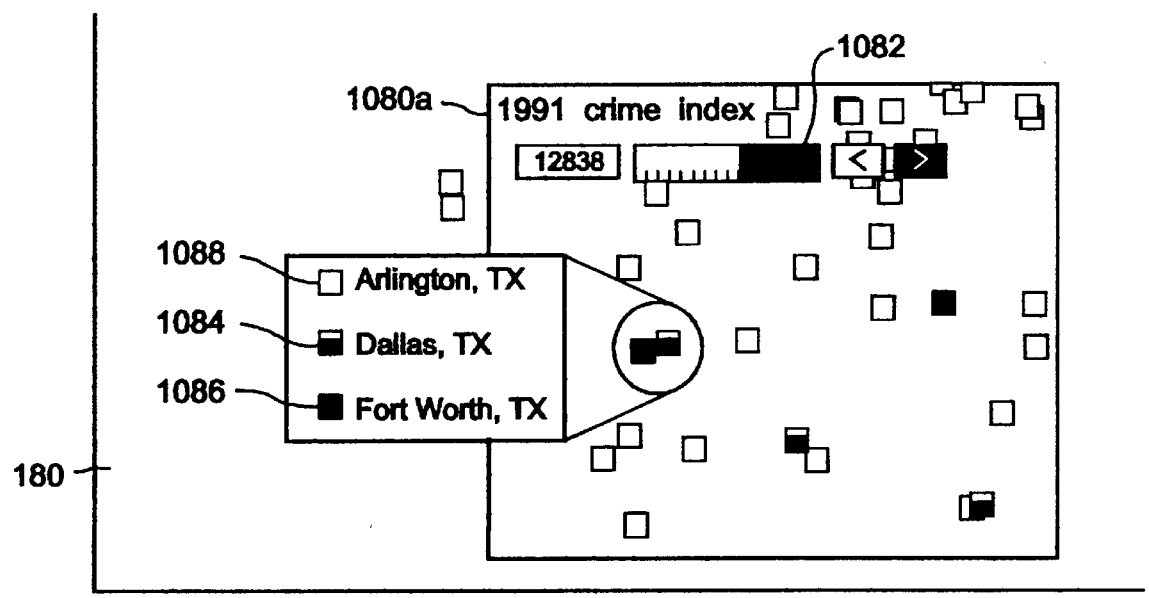

An example of the difference between using a boolean filter for screening and that of real-valued filtering is shown by FIGS. 9A and 9B. In FIG. 9A, a VOR 1080 with boolean filtering is screened for crime rate in Texas. Both Dallas and Fort Worth are returned as having high crime rates surpassing the threshold value of 12838 selected by the slider 1082 of VOR 1080. When, the VOR 1080*a* is configured to return real-valued figures, it is seen that Dallas has a lower crime rate than Fort Worth, since the box 1084 associated with Dallas, Texas is not entirely filled as is the square 1086 associated with Fort Worth.

With real valued filters, the slider value defines a specific threshold. For example, in FIG. 9A, the threshold is 12838. In the VOR 1080*a* of FIG. 9B, when screening for data greater than threshold (>) data below that threshold is assigned a score of 0 by the filter, as in the case of Arlington 1088. The city in the database with the greatest value for the data (in this example, for a city with a crime index of 18953) is assigned a score of 1.0. Cities with values between the threshold (12838) and the maximum (18953) are assigned a simple linear score equal to their value divided by the maximum value. For example, the crime rate of Dallas, Texas, which is 14214 is divided by the maximum crime index value of 18953, thereby returning a square filled approximately 75% as shown in 1084. When screening for values less than the threshold (<), values below that threshold are assigned a non-zero score in a similar manner.

Figure 10:
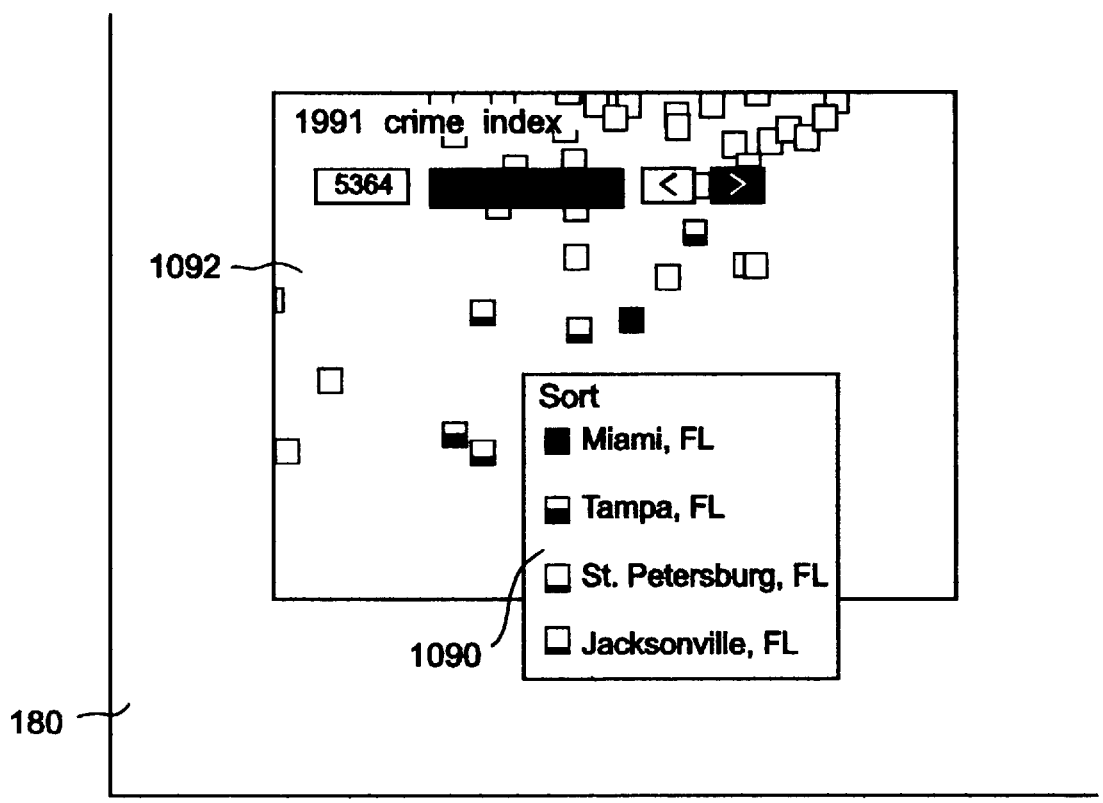
FIG. 10 illustrates a VOR working with real valued queries and a visual sorting filter.

With attention to another embodiment of the subject invention, computations can be performed on the output of real-valued VOR filters. For example, as depicted in FIG. 10, a sorting VOR 1090 placed over a real-valued crime rate VOR filter 1092, resulting in sorting cities found under the sorting lens.

When working with real-valued filters, it is necessary to use real-valued composition modes. Therefore, the AND, OR, NOR composition modes used for boolean filtering need to be replaced with real-valued MIN and MAX composition modes. MIN and MAX are represented by 0.0 and 1.0 similar to AND and OR representing 0 (false) and 1 (true). However MIN and MAX can also incorporate in-between values. A real-valued NOT filter will return a 1.0 minus its input value. Just as boolean filtering can be composed with an arbitrary boolean operation, and not simply AND and OR, real-valued filters can be composed with arbitrary numerical operations, not just MIN and MAX. These operations allow for statistical transformations used to change the data distribution (SQRT, ARCIN, etc.), fuzzy logic operators used to tune the query ("very" "somewhat" "more or less," etc), or mathematical operators used for general manipulation (difference, log etc.).

Databases in general, including the U.S. census database used in the particular examples do not always have all data fully defined. In the case of the U.S. census database, for example, some cities may have population figures included but not crime data, or visa versa. The subject invention includes an embodiment which takes this missing data into account.

Figure 11A:
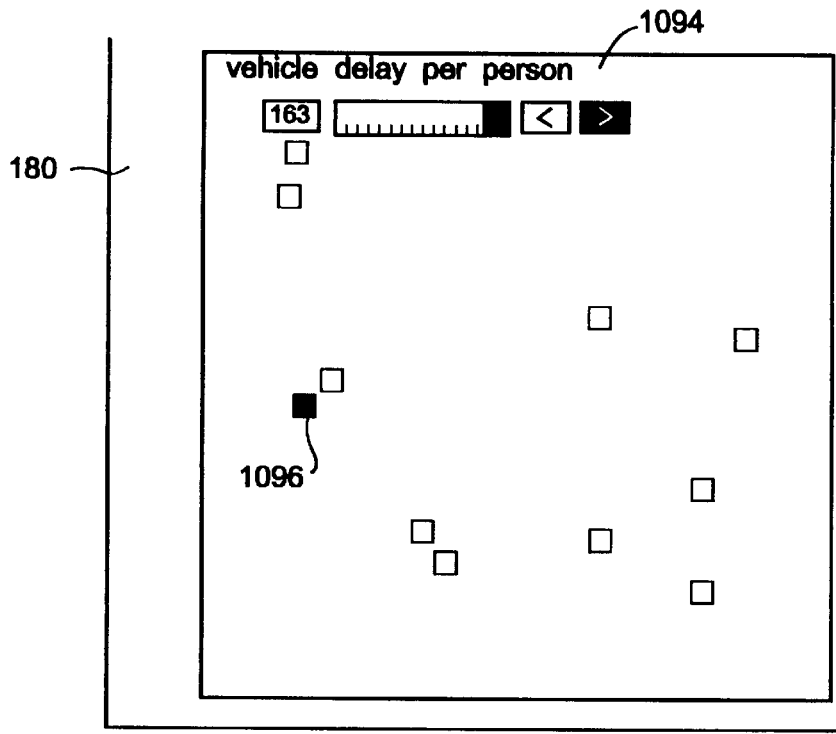
FIGS. 11A and 11B illustrate a VOR having filtering capabilities which recognizes missing data in a database.
Figure 11B:
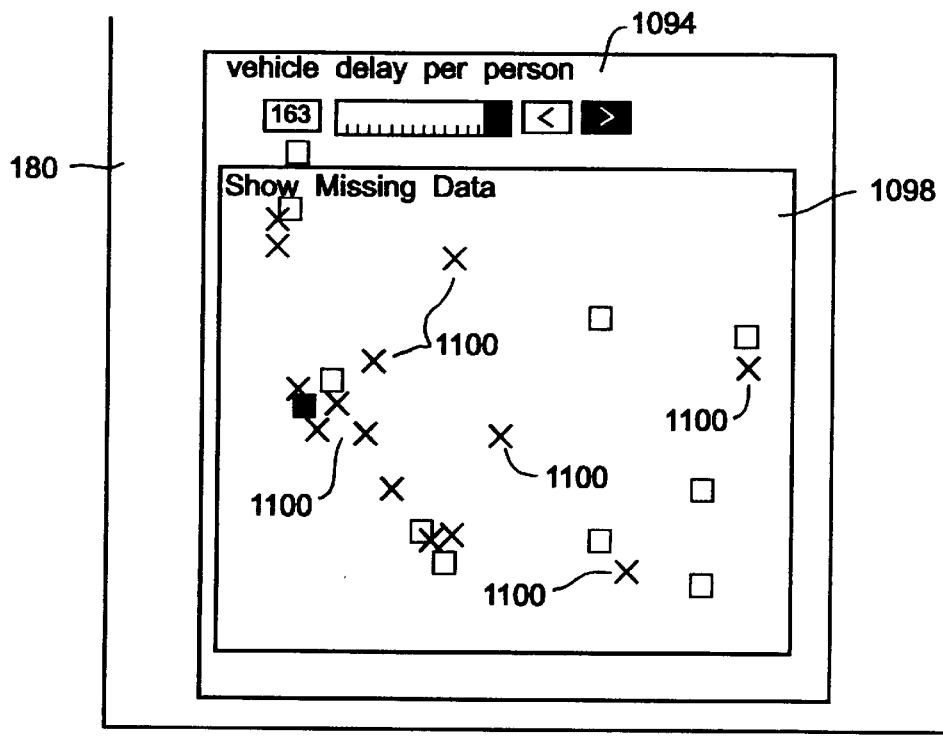

Visualization of missing data may be accomplished by use of a special lens. Normally, any city whose value as a result of a query is missing, or undefined, is simply not shown. However, a "show missing data" lens makes all cities visible. For example, FIG. 11A shows a VOR 1094 with a query, centered on the west coast of the United States to filter for cities with severe traffic delays. Only San Francisco 1096 is returned to have such delays (i.e. visualized by the filled in box). However, by adding a "show missing data" VOR 1098, as illustrated in FIG. 11B, it is realized that most other California communities do not have data for this category. Cities with missing data are marked with an "x" 1100.

Missing data has been incorporated into the semantics of composition by considering missing data to be analogous to the concept of a non-signaling Not-a-Number (NaN); a value that is defined to "afford retrospective diagnostic information inherited from invalid or unavailable data and results" (see: The IEEE Standard for Binary Floating Point Arithmetic, IEEE, New York, 1985). In accordance with common practice, it is then defined:

$$OR(a, NaN) = a, \; MAX(a, NaN) = a$$

$$F(a, NaN) = NaN, \text{ for all other compositions modes } F.$$

It is to be noted that a city that is invisible because of missing data may reappear when another filter is laid upon it; if that filter's composition mode is MAX or OR.

C. Producing composite images with more than two VORs

The illustrated embodiments showing two VORs and a single composite second image are not intended to limit the application or scope of the present invention in any way. The method and its variations illustrated above and encompassed by the appended claims may be expanded to apply to more than two viewing operation regions, as discussed more fully in Ser. No. 08/429,326.

It is evident that there has been provided in accordance with the present invention, a method that fully satisfies the aims and advantages hereinbefore set forth. While this invention has been described in conjunction with specific embodiments thereof, it is evident that many alternatives, modifications and variations will be apparent to those skilled in the art. Accordingly, the invention as herein described is intended to embrace all such alternatives, modifications and variations as fall within the scope of the appended claims.

Having thus described the preferred embodiments, the invention is claimed as follows:

1. A method of operating a machine comprising the steps of:

generating in a memory of the machine a database comprised of a plurality of objects and a plurality of sets of data attributes, each of the objects having one of the sets of data attributes linked thereto;

displaying on a display device of the machine a plurality of images each of the plurality of images representing one of the plurality of objects;

generating a first viewing operation region having a first viewing operation for selecting a first type of data attribute of the plurality of attributes;

positioning the first viewing operation region over a portion of the plurality of images on the display device;

operating the first viewing operation of the first viewing operation region to select data corresponding to the first type of data attribute, whereby the first viewing operation automatically filters data according to a predetermined criteria as the first viewing operation region is moved;

generating a second viewing operation region having a second viewing operation for selecting a second type of data attribute and further having a composition mode;

positioning the second viewing operation region over a portion of the plurality of images on the display device, the positioning of the second viewing operation region being done to be at least partially coextensive with the first viewing operation region, such that the first viewing operation region and the second viewing operation region are positioned over at least some of the same images displayed on the display device;

operating the second viewing operation of the second viewing operation region to select data corresponding to the second type of data attribute, whereby the second viewing operation automatically filters data according to a predetermined criteria as the second viewing operation region is moved, and for operating on the data selected by the first viewing operation and the data selected by the second viewing operation in accordance with the composition mode, for those images over which the first viewing operation region and the second viewing operation region are coextensively positioned; and, altering at least one of the images on the display device in response to results of the operation based on the composition mode.

2. The method according to claim 1 wherein the second viewing operation region is generated so that the composition mode may be interactively altered by a user of the machine, whereby an output of the composed first and second viewing regions is altered.

3. The method according to claim 1 wherein the viewing operation regions perform numerical transformations on real valued data in the viewed objects.

4. The method according to claim 1 wherein the composition mode is generated to perform boolean operations including at least AND, OR and NOT operations, in accordance with interactive selection by a user.

5. The method according to claim 1 wherein the composition mode is generated to operate on real-valued data.

6. The method according to claim 1 further including combining the first viewing operation region and the second viewing operation region to form a first compound viewing operation region, which operates as a single viewing operation region, including being moved, resized and deleted as a single entity having characteristics of the first and second viewing operation regions, and being controlled by a single set of controls.

7. The method according to claim 1 further including, generating a third viewing operation region having a third viewing operation for selecting a third type of data attribute and further having a next composition mode;

positioning the third viewing operation region on a portion of the plurality of images on the display device, the positioning of the third viewing operation region being done to be at least partially coextensive with the first and second viewing operation regions, such that the first viewing operation region, the second viewing operation region and the third viewing operation region are positioned over at least some of the same images displayed on the display device; and, operating the third viewing operation of the third viewing operation region to select data corresponding to the third type of data attribute, and for operating on the results of the composition mode of the second viewing operation, in accordance with the next composition mode, for those images over which the first viewing operation region, the second viewing operation region and the third viewing operation region are coextensively positioned.

8. The method according to claim 7 further including, generating and positioning on the display device, coextensive with the first, second and third viewing operation regions a fourth viewing operation region;

grouping the first and second viewing operation regions to form a first compound viewing operation region; and grouping the third and fourth viewing operation regions to form a second compound viewing operation region.

9. The method according to claim 8 further including, combining the first compound viewing operation region and the second compound viewing operation region to generate a third compound viewing operation region.

10. The method according to claim 1 further including generating the composition mode as a button interface, integrated with and carried on at least one of the first viewing region and the second viewing region, that is interactively adjustable by a user.

11. The method according to claim 1 further including generating an interactive adjustable parameter interface as part of at least one of the viewing operation regions wherein the parameter interface alters data which will be selected during one of the viewing operations.

12. The method according to claim 11, wherein the interactive adjustable parameter interface is an adjustable slider interface wherein the slider interface alters threshold values of data which will be selected during one of the viewing operations.

13. A method of operating a machine comprising the steps of:

generating in a memory of the machine a database comprised of a plurality of objects and a plurality of sets of data attributes, each of the objects having one of the sets of data attributes linked thereto;

displaying on a display device of the machine a plurality of images each of the plurality of images representing one of the plurality of objects whereby contents of the database are visually provided to a user, and the plurality of images correspond to a record in the database;

generating a first viewing operation region having a first viewing operation for selecting a first type of data attribute of the plurality of attributes;

positioning the first viewing operation region over a portion of the plurality of images on the display device;

operating the first viewing operation of the first viewing operation region to select data corresponding to the first type of data attribute, whereby the first viewing operation automatically filters data according to a predetermined criteria as the first viewing operation region is moved, the filtering by the first viewing operation region consisting of performing Boolean and numerical transformations on the data of the viewed images including real-valued transformations on numerical data in the database;

generating a second viewing operation region having a second viewing operation for selecting a second type of data attribute and further having a composition mode;

positioning the second viewing operation region over a portion of the plurality of images on the display device, the positioning of the second viewing operation region being done to be at least partially coextensive with the first viewing operation region, such that the first viewing operation region and the second viewing operation region are positioned over at least some of the same images displayed on the display device;

operating the second viewing operation of the second viewing operation region (i) to select data corresponding to the second type of data attribute, whereby the second viewing operation automatically filters data according to a predetermined criteria as the second viewing operation region is moved, the filtering by the second viewing operation region consisting of performing numerical transformations on real-valued data of the viewed images, and (ii) for operating on the data selected by the first viewing operation and the data selected by the second viewing operation in accordance with the composition mode, for those images over which the first viewing operation region and the second viewing operation region are coextensively positioned;

generating an interactive adjustable parameter interface as part of at least one of the viewing operation regions wherein the parameter interface alters data which will be selected during one of the viewing operations; and altering at least one of the images on the display device in response to results of the operation based on the composition mode.

14. The method according to claim 13 wherein the second viewing operation region is generated so that the composition mode may be interactively altered by a user of the machine, whereby an output of the composed first and second viewing regions is altered.

15. The method according to claim 13 wherein the composition mode is generated to operate on real-valued data.

16. The method according to claim 13, wherein the interactive adjustable parameter interface is an adjustable slider interface wherein the slider interface alters threshold values of data which will be selected during one of the viewing operations.

17. A machine for visually formulating database queries comprising:

means for generating in a memory of the machine a database comprised of a plurality of objects and a plurality of sets of data attributes, each of the objects having one of the sets of data attributes linked thereto;

means for displaying on a display device of the machine a plurality of images each of the plurality of images representing one of the plurality of objects;

means for generating a first viewing operation region having a first viewing operation for selecting a first type of data attribute of the plurality of attributes;

means for positioning the first viewing operation region over a portion of the plurality of images on the display device;

means for operating the first viewing operation of the first viewing operation region to select data corresponding to the first type of data attribute, whereby the first viewing operation automatically filters data according to a predetermined criteria as the first viewing operation region is moved;

means for generating a second viewing operation region having a second viewing operation for selecting a second type of data attribute and further having a composition mode;

means for positioning the second viewing operation region over a portion of the plurality of images on the display device, the positioning of the second viewing operation region being done to be at least partially coextensive with the first viewing operation region, such that the first viewing operation region and the second viewing operation region are positioned over at least some of the same images displayed on the display device;

means for operating the second viewing operation of the second viewing operation region to select data corresponding to the second type of data attribute, whereby the second viewing operation automatically filters data according to a predetermined criteria as the second viewing operation region is moved, and for operating on the data selected by the first viewing operation and the data selected by the second viewing operation in accordance with the composition mode, for those images over which the first viewing operation region and the second viewing operation region are coextensively positioned; and, means for altering at least one of the images on the display device in response to results of the operation based on the composition mode.

18. The method according to claim 17 further including an interactive adjustable parameter interface as part of at least one of the viewing operation regions wherein the parameter interface alters data which will be selected during one of the viewing operations.

* * * * *